US009836613B2

(12) United States Patent
Edge et al.

(10) Patent No.: US 9,836,613 B2
(45) Date of Patent: Dec. 5, 2017

(54) OBFUSCATING THE LOCATIONS OF ACCESS POINTS AND FEMTOCELLS

(71) Applicant: QUALCOMM Incorporated, San Diego, CA (US)

(72) Inventors: Stephen William Edge, Escondido, CA (US); Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 310 days.

(21) Appl. No.: 14/042,721

(22) Filed: Sep. 30, 2013

(65) Prior Publication Data

US 2014/0331329 A1 Nov. 6, 2014

Related U.S. Application Data

(60) Provisional application No. 61/818,855, filed on May 2, 2013.

(51) Int. Cl.
*H04Q 7/10* (2006.01)
*G06F 21/60* (2013.01)
(Continued)

(52) U.S. Cl.
CPC .......... *G06F 21/606* (2013.01); *G01S 5/0205* (2013.01); *H04W 64/003* (2013.01); *G06F 2221/2111* (2013.01)

(58) Field of Classification Search
CPC ... H04W 24/00; H04W 64/00; H04W 64/003; H04W 12/02; G01S 19/39
(Continued)

(56) References Cited

U.S. PATENT DOCUMENTS 7,126,527 B1   10/2006  Bajikar
7,139,820 B1 * 11/2006  O'Toole, Jr. .......... H04L 63/123
                                                                               701/468
(Continued)

OTHER PUBLICATIONS

Treu, G., et al., "Anonymization in Proactive Location Based Community Services", Adjunct Proceedings of 3rd International Conference on Pervasive Computing. Pervasive, Jan. 1, 2005, Retrieved from the Internet: URL:http://www.pervasive.ifi.lmu.de/adjunct-proceedings/poster/p049-053.pdf, retrieved on Apr. 16, 2015, 5 pages.

(Continued)

*Primary Examiner* — Julio Perez
(74) *Attorney, Agent, or Firm* — Kilpatrick Townsend & Stockton, LLP

(57) ABSTRACT

Methods and apparatuses are presented for obfuscating the locations of terrestrial wireless transceivers, including wireless access points and femtocells. According to some embodiments, a method may receive, by a mobile device, data for a terrestrial wireless transceiver, wherein the data includes location coordinates of the terrestrial wireless transceiver, and wherein the location coordinates include an error term. Additionally, the method may include determining the error term based on the data. Furthermore, the method may include determining a corrected location of the terrestrial wireless transceiver by removing the error term from the location coordinates. In some instances, the data can further include a unique identifier associated with the terrestrial wireless transceiver, and wherein the error term is further determined based on the unique identifier.

34 Claims, 11 Drawing Sheets

(51) Int. Cl.
*H04W 64/00* (2009.01)
*G01S 5/02* (2010.01)

(58) Field of Classification Search
USPC .................................. 455/456.1, 12.1, 427
See application file for complete search history.

(56) References Cited

U.S. PATENT DOCUMENTS

| | | | | |
|---|---|---|---|---|
| 7,463,979 | B2* | 12/2008 | King | G01S 5/0063 |
| | | | | 342/357.64 |
| 7,602,338 | B2* | 10/2009 | Smith | G01S 5/021 |
| | | | | 342/451 |
| 8,190,171 | B2* | 5/2012 | Selgert | H04W 8/10 |
| | | | | 455/404.1 |
| 8,195,817 | B2 | 6/2012 | Xue et al. | |
| 8,654,974 | B2* | 2/2014 | Anderson | H04L 9/0841 |
| | | | | 380/247 |
| 8,655,389 | B1* | 2/2014 | Jackson | G01S 19/39 |
| | | | | 455/414.1 |
| 2002/0198632 | A1 | 12/2002 | Breed et al. | |
| 2004/0203853 | A1* | 10/2004 | Sheynblat | G01S 1/026 |
| | | | | 455/456.1 |
| 2009/0170477 | A1 | 7/2009 | Bensimon et al. | |
| 2009/0312034 | A1 | 12/2009 | Burroughs et al. | |
| 2010/0178934 | A1* | 7/2010 | Moeglein | G01S 19/12 |
| | | | | 455/456.1 |
| 2012/0050033 | A1 | 3/2012 | Westen | |
| 2012/0276920 | A1 | 11/2012 | Mangold et al. | |
| 2012/0309416 | A1 | 12/2012 | Whelan et al. | |
| 2013/0036238 | A1 | 2/2013 | Chowdhary et al. | |

OTHER PUBLICATIONS

International Search Report and Written Opinion—PCT/US2014/035696—ISA/EPO—Dec. 9, 2014.

* cited by examiner

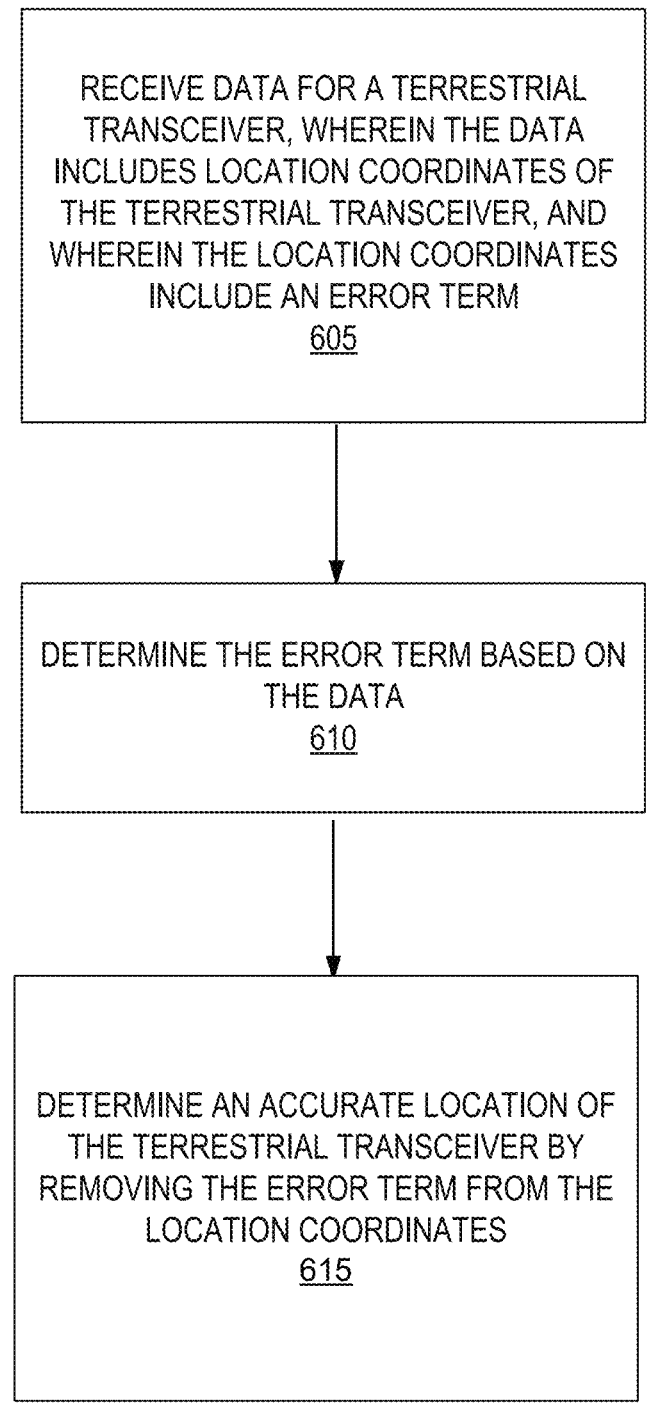

OBFUSCATING THE LOCATIONS OF ACCESS POINTS AND FEMTOCELLS

CROSS-REFERENCE TO RELATED APPLICATIONS

This application claims the benefit of Provisional U.S. Application Ser. No. 61/818,855, entitled "OBFUSCATING THE LOCATIONS OF ACCESS POINTS AND FEMTOCELLS," filed May 2, 2013, which is assigned to the assignee hereof and expressly incorporated herein by reference in its entirety and for all purposes.

BACKGROUND

Field

The present disclosure relates to location determination for mobile wireless devices. Specifically, various techniques are provided for obfuscating the locations of terrestrial wireless transceivers, including wireless access points and femtocells.

Background

Location determination for mobile wireless devices enable the current location and optionally speed and heading of a mobile wireless device to be obtained and the determined location to be provided to the wireless device (e.g., to an application running on the wireless device or to the user of the wireless device) or to some external third party.

A number of software applications, websites, and other functionalities that can be provided on or to a mobile device are beginning to use location-based services to further enhance a user's experience when using such a device. For example, a device may access a particular website, such as a restaurant review website, and the website may use information about the device's current location in order to provide location-specific content, such as reviews of nearby restaurants, to the device. Other applications and websites may, for instance, use information about a device's current location to display relevant maps to a user, provide the user with information about local businesses, provide navigation directions or inform the user of a local weather forecast or local traffic conditions. Certain applications and websites may be dedicated to providing location related content for indoor use, such as walking directions to reach a particular gate in an airport, particular store in a shopping mall or particular room in an office building. These applications and websites may rely on accurate location information for a mobile device in order to reliably provide such location content in an environment where small changes in location may have significant consequences for location related content (e.g. in terms of providing content applicable to a user who is on one side or another of a wall or on one floor versus another floor of a multi-floor building or just inside or just outside of a building).

By having more accurate location determination, more location-appropriate functionality and/or information can be provided to the user. To help enable accurate location based services (e.g. in an indoor environment), a mobile device may be provided (e.g. by a network location server) with the known locations for various wireless access points (APs), base stations and/or femtocells that are nearby to the mobile device and whose radio signals can be received and measured by the mobile device to enable the mobile device to estimate its own location. Examples of problems with provision of accurate AP, base station and femtocell locations in a vendor competitive and/or operator competitive environment to all mobile devices include providing costly or sensitive positioning information to mobile devices from competitors, to mobile devices associated with other service providers, to mobile devices whose users have not enrolled in an appropriate program, to mobile devices whose vendors have not agreed to a privacy agreement, or to mobile devices whose users have not paid a subscription fee. There may be privacy and security issues where the venue owner may not want everyone to know the locations of the femtocells and access points in the venue. It may be preferred (e.g. by the provider of the AP, base station and femtocell location data) that only certain mobile devices (e.g. mobile devices whose home operator or vendor has a business relationship with the location data provider) receive the full benefit of this accurate location data. In addition, other location providers (e.g., location providers associated with non-preferred mobile devices) may be able to collect and use the accurate location data to populate their own database with the collected AP, base station and femtocell locations and make use of this stored data at a later time to provide a rival location service to that offered by the original provider of this accurate location data.

BRIEF SUMMARY

Various techniques are provided for obfuscating the locations of terrestrial wireless transceivers, including access points and femtocells.

In some embodiments, a method is presented. The method may include receiving, by a mobile device, data for a terrestrial transceiver, wherein the data includes location coordinates of the terrestrial transceiver, and wherein the location coordinates include an error term. The method may also include determining the error term based on the data, and determining a corrected location of the terrestrial transceiver based on removing the error term from the location coordinates.

In some embodiments, the data further includes a unique identifier associated with the terrestrial transceiver, and the error term is further determined based on the unique identifier. In some embodiments, the unique identifier comprises a MAC address, and determining the error term further includes: determining one or more binary values using the MAC address; and multiplying the one or more binary values by a known scaling factor to calculate the error term. In some embodiments, the unique identifier comprises a cell ID, and determining the error term further includes: determining one or more binary values using the cell ID; and multiplying the one or more binary values by a known scaling factor to calculate the error term.

In some embodiments, the error term is determined based on transforming bits in the location coordinates, based on a known ciphering key or known transformation method.

In some embodiments, the data further includes a second location associated with a second terrestrial transceiver, and determining the error term further comprises: determining, by the mobile device, a mapping table, wherein the mapping table includes association information about the terrestrial transceiver and the second terrestrial transceiver; and calculating the error term based on the mapping table and the second location, wherein the corrected location of the terrestrial transceiver comprises the second location based on the mapping table.

In some embodiments, determining the error term further includes: receiving information from a location server associated with the mobile device and a first server; determining the error term based on the received information.

In some embodiments, determining the error term further comprises: receiving broadcast information from the terrestrial transceiver; and determining the error term based on the broadcast information.

In some embodiments, the data further includes a serving network ID or a provider ID, and determining the error term is further based on the serving network ID or the provider ID.

In some embodiments, determining the error term further includes: storing, by the mobile device, a known ciphering key; and altering bits associated with the received data, wherein the altering is based on the known ciphering key.

In some embodiments, a mobile device is presented. The mobile device may include memory, a transceiver configured to receive data for a terrestrial transceiver, wherein the data includes location coordinates of the terrestrial transceiver, and wherein the location coordinates include an error term, and one or more processors configured to: determine the error term based on the data; and determine a corrected location of the terrestrial transceiver based on removing the error term from the location coordinates.

In some embodiments, one or more computer-readable media is presented. The one or more computer-readable media may store computer-executable instructions that, when executed, cause one or more computing devices included in a mobile device to: receive data for a terrestrial transceiver, wherein the data includes location coordinates of the terrestrial transceiver, and wherein the location coordinates include an error term; determine the error term based on the data; and determine a corrected location of the terrestrial transceiver based on removing the error term from the location coordinates.

In some embodiments, an apparatus is presented. The apparatus may include means for receiving data for a terrestrial transceiver, wherein the data includes location coordinates of the terrestrial transceiver, and wherein the location coordinates include an error term; means for determining the error term based on the data; and means for determining a corrected location of the terrestrial transceiver based on means for removing the error term from the location coordinates.

In some embodiments, another method is presented. The method may include: receiving a request for location coordinates of a terrestrial transceiver; providing, to a mobile device, the location coordinates of the terrestrial transceiver, wherein the location coordinates include an error term; and providing, to the mobile device, correction data, wherein the correction data is configured to generate a corrected location of the terrestrial transceiver based on removing the error term from the location coordinates.

In some embodiments, the error term is generated based on a unique identifier associated with the terrestrial transceiver, and wherein the correction data further includes the unique identifier. In some embodiments, the unique identifier includes a MAC address, and the error term is generated based further on: generating one or more binary values using the MAC address; and multiplying the one or more binary values by a known scaling factor to calculate the error term. In some embodiments, the unique identifier comprises a cell ID, and wherein the error term is generated based further on: generating one or more binary values using the cell ID; and multiplying the one or more binary values by a known scaling factor to calculate the error term.

In some embodiments, the error term is generated based on transforming bits in the location coordinates, based on a known ciphering key.

In some embodiments, the error term is generated based on: broadcast information transmitted from the terrestrial transceiver; and generating the error term based on the broadcast information.

In some embodiments, the correction data further includes a serving network ID or a provider ID, and wherein the error term is generated based further on the serving network ID or the provider ID.

In some embodiments, the correction data further comprises a known ciphering key; and the error term is generated based further on altering bits based on the known ciphering key.

In some embodiments, another apparatus is presented. The apparatus may include a transceiver configured to: receive a request for location coordinates of a terrestrial transceiver; provide, to a mobile device, the location coordinates of the terrestrial transceiver, wherein the location coordinates include an error term; and provide, to the mobile device, correction data, wherein the correction data is configured to generate a corrected location of the terrestrial transceiver based on removing the error term from the location coordinates.

In some embodiments, another apparatus is presented. The apparatus may include means for receiving a request for location coordinates of a terrestrial transceiver; means for providing, to a mobile device, the location coordinates of the terrestrial transceiver, wherein the location coordinates include an error term; and means for providing, to the mobile device, correction data, wherein the correction data is configured to generate a corrected location of the terrestrial transceiver based on removing the error term from the location coordinates.

In some embodiments, one or more computer-readable media is presented. The one or more computer-readable media may store computer-executable instructions that, when executed, cause one or more computing devices to: receive a request for location coordinates of a terrestrial transceiver; provide, to a mobile device, the location coordinates of the terrestrial transceiver, wherein the location coordinates include an error term; and provide, to the mobile device, correction data, wherein the correction data is configured to generate a corrected location of the terrestrial transceiver based on removing the error term from the location coordinates.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 6 is an exemplary flowchart for determining locations of terrestrial wireless transceivers whose locations have been obfuscated, according to some embodiments.

DETAILED DESCRIPTION

Figure 1:
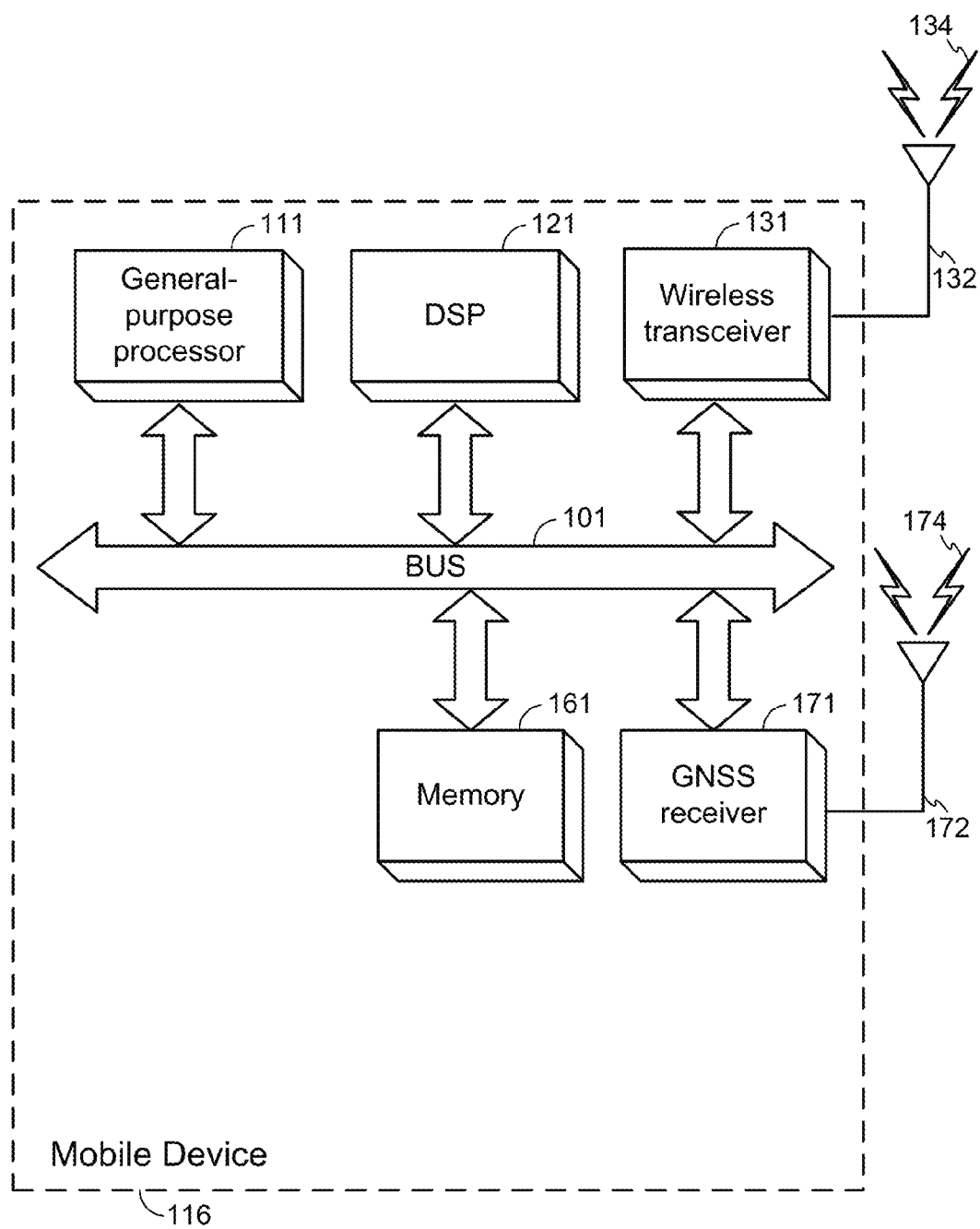
FIG. 1 is a block diagram illustrating an exemplary mobile device according to some embodiments.

The word "exemplary" is used herein to mean "serving as an example, instance, or illustration." Any embodiment or design described herein as "exemplary" is not necessarily to be construed as preferred or advantageous over other embodiments or designs.

Apparatuses, methods, systems and computer-readable media for obfuscating the locations of terrestrial wireless transceivers, including access points, femtocells, and base stations, are presented. As used herein, a "terrestrial transceiver" or "terrestrial wireless transceiver" may refer to any ground-stationed (i.e. terrestrial based) device configured to transmit information about its location to a client device (e.g. a mobile device). The information pertaining to its location may include, for example, ranging measurements to the client device, relative to the terrestrial wireless transceiver, and other types of data known to those with skill in the art. Non-limiting examples of terrestrial wireless transceivers include access points, femto cells, base stations, picocells, macrocells, Zigbee™ transceivers, and Bluetooth™ transceivers. Femto cells may be thought of as small base stations, sometimes known as home base stations or small cells, that support a small coverage area such as a home, office or part of a building or venue and that may be installed by users and not by a network operator. Further details about terrestrial wireless transceivers will be discussed below.

The techniques described herein may be used for mobile device or client access to various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, IS-856 and High Rate Packet Data (HRPD) standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA is part of Universal Mobile Telecommunication System (UMTS). Long Term Evolution (LTE) is a radio access technology used by E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). IEEE 802.11 networks are also known as WiFi networks or wireless local area networks (WLANs) and are defined in a family of standards from the Institute of Electrical and Electronics Engineers (IEEE). These various radio technologies and standards are known in the art.

Various embodiments are described herein in connection with a mobile device. A mobile device can also be called a system, subscriber unit, subscriber station, mobile station, mobile, remote station, remote terminal, mobile device, user terminal, terminal, mobile terminal, wireless device, wireless terminal, wireless communication device, user agent, user device, Secure User Plane (SUPL) Enabled Terminal (SET) or user equipment (UE). A mobile device or SET can be a cellular telephone, a cordless telephone, a smartphone, a Session Initiation Protocol (SIP) phone, a wireless local loop (WLL) station, a personal digital assistant (PDA), a handheld device having wireless connection capability, a computing device, a laptop, a tablet or other processing device connected to or containing a modem, for example, a wireless modem. Moreover, various embodiments are described herein in connection with a base station. A base station can be utilized for communicating with mobile device(s) via radio signals in order to provide communication, location and/or other services to mobile devices and can also be referred to as an access point, Node B, Evolved Node B (eNodeB), access point base station, a WiFi, an access point, a Femtocell, home base station, home Node B, home eNodeB or some other terminology.

Aspects of the disclosure relate to location determination for mobile wireless devices. Specifically, various techniques are provided for obfuscating the locations of terrestrial wireless transceivers.

In some instances, a mobile device can estimate a position as a result of receiving, measuring and/or decoding signals from terrestrial wireless transceivers, and may be assisted by data from a terrestrial communications system. Such assistance data may reduce a time required by the mobile device to acquire and possibly measure positioning signals, and may include information to allow position calculation, such as location of base stations or access points, transmission timing of or between base stations.

However, determining the locations of APs and femtocells or other terrestrial wireless transceivers can be difficult, time consuming and costly to obtain by conventional means. Conventional means can include: surveying using either instrumentation or accurate maps or building plans; manually surveying the building; using a GPS receiver inside each terrestrial wireless transceiver; having users who deploy a WiFi terrestrial wireless transceiver report a civic location to their network operator; having users measure and report a relative location in addition to a civic location when a civic location alone is imprecise; and measuring wireless signal parameters of detected transceivers using drive-by vehicles, which can determine the location by using fingerprinting or trilateration techniques based upon the measured signal parameters.

Alternatively, crowdsourcing location related measurements from mobile devices, typically processed on a location related server can be a less expensive and more accurate and reliable method of locating terrestrial wireless transceivers. Crowdsourcing includes the method of using a server to combine measurements relating to the same terrestrial wireless transceivers from many mobile devices to obtain accurate location information.

For example, in mobile device crowdsourcing, a multitude of mobile devices can each send their current location and additional observed data to a location related server. Examples of observed data can include received signal strength information, transmission timing information for base stations (and/or APs and femtocells) or between base stations (and/or APs and femtocells), round-trip-time (RTT) measurements, or the like. The observed data can further be associated with a particular source identifier for the signals for which measurements are provided (e.g., a cell-identifier (ID) of a base station, media access control (MAC) address of an access point) and tagged with the mobile device's current location, if available.

The crowdsourced information (e.g., base station, femtocell and/or access point locations, base station, femtocell and/or access point estimated coverage areas, base station, femtocell and/or access point timing) can be stored in a database of the vendor and/or operator. Additionally, even though an individual UE-observed data may be inaccurate, the consensus of the multitude of UEs may be more precise.

The obtained locations from either crowdsourcing or conventional means can then be provided to the terrestrial wireless transceivers, and/or to location servers that support location of UEs in the coverage of the terrestrial wireless transceivers, for subsequent broadcast or point-to-point transfer to mobile devices who may subsequently use this information in order to position themselves—e.g. by performing measurements of RTT and/or transmission timing for certain nearby terrestrial wireless transceivers whose locations have been provided.

The efforts to determine the locations of terrestrial wireless transceivers, such as WiFI APs and Femtocells, may be taken advantage of by competitor vendors and/or competitor service providers in the WiFi and cellular industry, which may be undesirable for the owners of such terrestrial wireless transceivers. For example, a mobile device having a subscription to a competitor of the terrestrial wireless transceiver owner may still utilize the determined locations of said terrestrial wireless transceivers. Similarly, competitor location providers may use freely the determined locations of the terrestrial wireless transceivers, even though they may not have originally participated in the difficult and painstaking task of determining the locations of the terrestrial wireless transceivers. In essence, a freeloading or free rider problem may exist that enables vendors' or service providers' efforts in determining the locations of terrestrial wireless transceivers to be taken advantage of by other vendors or service providers. Thus, it would be desirable to provide an advantage or benefit to "preferred" users within the network who are associated with the vendor or service provider who obtains the accurate locations for terrestrial wireless transceivers.

According to some embodiments of the present invention, the location information for APs and femtocells and other terrestrial wireless transceivers may be obfuscated when sent to mobile devices. The obfuscated information may be less accurate than the original information though still usable to provide less precise location services. For example, the obfuscated information may still support direction finding to within say 50 meters of an intended destination but not precise direction finding down to say 5 meters. Mobile devices that may be considered preferred (e.g. whose home operator or device vendor has a business relationship with the provider of the location information) may be enabled to obtain the original more precise location information in various ways described further on herein. This additional capability may not be enabled for non-preferred mobile devices. Non-preferred mobile devices may include mobile devices from a different vendor and/or operator (e.g. a vendor or operator without a business relationship with the provider of the location information).

Additionally, for mobile devices that may access different types of wireless communication networks, location services may be supported using a location related server that can be accessed from, and in some cases may be resident within, the wireless network currently being accessed by the mobile device. The role of the location related server may be to assist the mobile device by giving the mobile device additional data to make appropriate location related measurements (e.g., measurements of radio signals from access points, femtocells and/or other base stations in the serving wireless network or measurements of various global navigation satellites) and to know the location of the access points to which the measurements are being made from. Furthermore, in some cases, the location related server may compute the mobile device's location based on these measurements. In other cases, the location related server may provide the locations of nearby access points, femtocells and/or other base stations to enable a mobile device to compute an estimate of its own location based on measurements of signals by the mobile devices from these nearby access points, femtocells and/or other base stations. In performing these roles, a location related server and/or mobile device may need to rely on the availability of an accurate set of locations for APs, base stations and/or femtocells. If, in some instances the accurate locations are obfuscated for non-preferred mobile devices and/or non-preferred location related servers, those devices will calculate less accurate locations than preferred devices that have access to the accurate locations. These descriptions and others will be discussed in more detail in relation to the figures discussed below.

FIG. 1 is a block diagram illustrating an exemplary mobile device 116, according to some embodiments. The mobile device 116 may include one or more wireless transceivers 131 connected to the bus 101. The wireless receiver 131 may be operable to receive a wireless signal 134 via antenna 132. The wireless signal 134 may be transmitted via a wireless network. In some embodiments, the wireless network may be any wireless network such as a wireless LAN (WLAN) such as WiFi, a Personal Access Network (PAN), such as Bluetooth™ or Zigbee™, or a cellular network (e.g. a GSM, WCDMA, LTE, CDMA2000 network). In some embodiments, antennas 132 and 172 may be the same antenna. Wireless transceiver 131 via antenna 132 may be configured to receive various radio frequency (RF) signals 134 from one or more terrestrial wireless transceivers. Mobile device 116 may be configured to obtain information about its own location and/or of the locations of the terrestrial wireless transceivers. This information may come in various forms, including ranging information, such as received signal strength indicator (RSSI) measurements, round trip time (RTT) measurements, 2-dimensional or 3-dimensional coordinates, or other types of formats known to those with skill in the art, for terrestrial wireless transceivers. Mobile device 116 may be configured to measure multiple sets of ranging information for multiple terrestrial wireless transceivers in order to determine the location of mobile device 116. Mobile device 116 may also be configured to decode and/or decrypt, via the DSP 121 and/or general purpose processor 111, some or all of the information provided by the terrestrial wireless transceivers, in the event that, for example, some information (e.g. location coordinates of a transceiver) was obfuscated as described later herein. Mobile device 116 may be configured to process the wireless signals 134, in whole or in part, and/or calculate the location of the mobile device 116. In some embodiments, multiple wireless transceivers 131 may be used for location determination and/or communication. For example, in some embodiments, a WAN transceiver, a WLAN transceiver and/or a PAN transceiver, or any combination of the above, may be used for communication and/or location purposes. In some embodiments, multiple transceivers of similar type such as multiple WAN transceivers for the support of multiple air interfaces and/or multiple PAN interfaces such as for the support of both Bluetooth and Zigbee may be used for communication and/or location purposes.

The location coordinates of terrestrial wireless transceivers may have a key role in enabling a mobile device 116 to determine its own location. By measuring an RSSI, RTT, time difference of arrival, pseudo range and/or some other characteristic for a signal received from a terrestrial wireless transceiver and by combining these measurements with other similar measurements for other terrestrial wireless transceivers and possibly with other measurements (e.g. measurements for GNSS satellites or obtained from inertial sensors in the mobile device 116), a mobile device 116 may be able to calculate its current location and optionally its speed and heading. Such a calculation may depend on the mobile device 116 knowing the accurate locations for all terrestrial wireless transceivers for which measurements were made and used for the location calculation. If terrestrial wireless transceiver locations were provided to mobile device 116 in an obfuscated manner (i.e. containing additional errors) and if mobile device 116 is unable to remove these errors, then the resulting location estimate for mobile device 116 may be less accurate. On the other hand, if mobile device can remove the errors in any obfuscated locations for terrestrial wireless transceivers, then the calculated location for mobile device 116 may be more accurate. This could be of significant benefit to a preferred mobile device 116 that is able to remove errors from obfuscated locations for terrestrial wireless transceivers.

The mobile device 116 may also include a global navigation satellite system (GNSS) receiver 171 capable of receiving GNSS signals 174 via a GNSS antenna 172 coupled to the GNSS receiver 171. The GNSS receiver 171 may also process, in whole or in part, the GNSS radio signals 174 and use the GNSS signals 174 to determine the location of the mobile device 116. In some embodiments, general-purpose processor(s) 111, memory 161, DSP(s) 121, and specialized processors (not shown) may also be utilized to process the GNSS signals 174, in whole or in part, and/or calculate the location of the mobile device 116, in conjunction with GNSS receiver 171. The storage of GNSS or other location signals may be done in memory 161 or other registers (not shown).

The mobile device 116 may include DSP(s) 121 connected to a bus 101, general-purpose processor(s) 111 connected to the bus 101, and memory 161 connected to the bus 101. In various embodiments, functions may be stored as one or more instructions or code in memory 161, such as on a computer-readable storage medium, such as RAM, ROM, FLASH, or disc drive, and executed by general-purpose processor(s) 111, specialized processors, or DSP(s) 121. These functions may include determining an accurate or corrected location of the mobile device 116, using the information provided by terrestrial wireless transceivers, measuring signals from the terrestrial wireless transceivers and removing any obfuscation information or error terms in information provided by the terrestrial wireless transceivers. Memory 161 may be a processor-readable memory and/or a computer-readable memory that stores software code (programming code, instructions, etc.) configured to cause the general-purpose processor(s) 111 and/or DSP(s) 121 to perform the functions described. In other embodiments, the functions described may be performed in hardware.

The mobile device 116 may be a cellphone, smartphone. PDA, tablet, laptop, tracking device or some other wireless supportable and moveable device and may be referred to as a mobile terminal, mobile station (MS), terminal, device, wireless device, user equipment (UE), SUPL Enabled Terminal (SET), target device, target or by some other name. The location of mobile device 116 may be referred to as a location estimate, position or position estimate and the operation whereby the location is obtained may be referred to as location, locating, positioning or by some other name.

The mobile devices may be supported by a variety of terrestrial wireless transceivers such as, but not limited to, wireless access points and femtocells.

Figure 2:
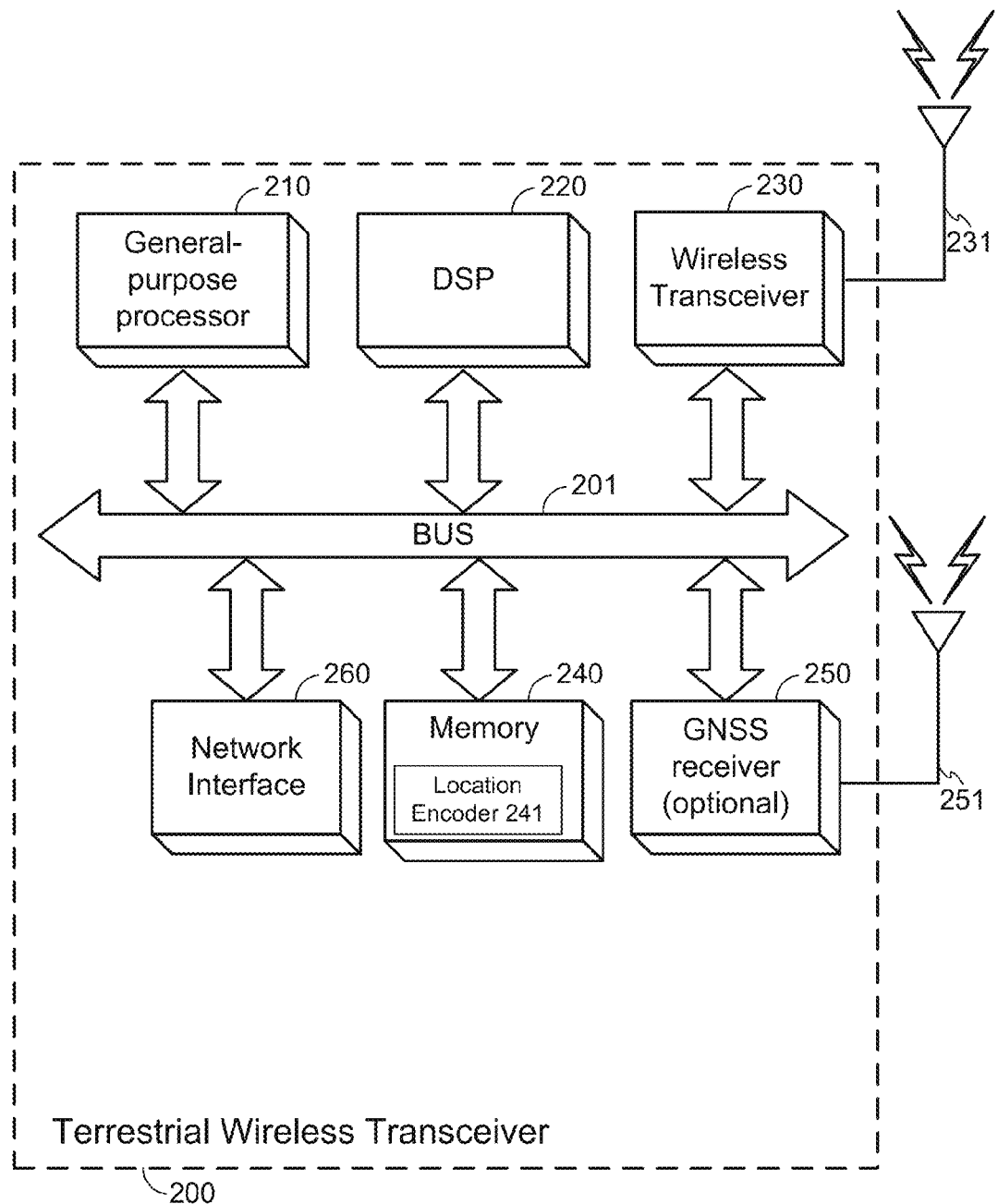
FIG. 2 is a block diagram illustrating an exemplary terrestrial wireless transceiver according to some embodiments.

FIG. 2 illustrates an exemplary terrestrial wireless transceiver, according to some embodiments. Here, terrestrial wireless transceiver 200 may include a GNSS receiver 250, general-purpose processor(s) 210, memory 240, DSP(s) 220, a wireless transceiver 230, a bus 201, and antennas 231 and 251. In some embodiments, antennas 231 and 251 may be the same antenna. Furthermore, in addition to the wireless transceiver 230, terrestrial wireless transceiver 200 can further include a network interface (not shown) to communicate with a network (e.g., a network of a preferred carrier, Internet, etc.). Memory 240 may also contain a location encoder 241 that may be configured to encode information pertaining to the location of terrestrial wireless transceiver 200 and/or store the location of a previously encoded location of a terrestrial wireless transceiver. Terrestrial wireless transceiver 200 may be referred to as a Home NodeB (HNB) or Home eNode B (HeNB). Example terrestrial wireless transceivers 200 may include access points (e.g. WiFi access points), femto cells, base stations, picocells, macrocells, Bluetooth™ transceiver, Zigbee™ transceiver or other suitable terrestrial wireless transceiver type.

In some embodiments, terrestrial wireless transceiver 200 may be equipped with multiple antenna groups, not shown. The multiple antennas may facilitate communication with multiple mobile devices, such as mobile device 116. In some embodiments, terrestrial wireless transceiver may communicate with preferred and non-preferred mobile devices. As alluded to, above, a preferred mobile device may be a device registered with a subscription aligned with the terrestrial wireless transceiver. For example, the terrestrial wireless transceiver may be owned by the same company that licenses the subscription to preferred device 116 or that provides an application (App) to preferred mobile device 116 or that provides location services to preferred mobile device 116. A non-preferred device may be a device that does not possess the same privileges or advantages as a preferred device. Various other conditions creating a preferred and non-preferred tier readily apparent to those with skill in the art are within the scope of the present disclosures, and embodiments are not so limited.

Figure 3:
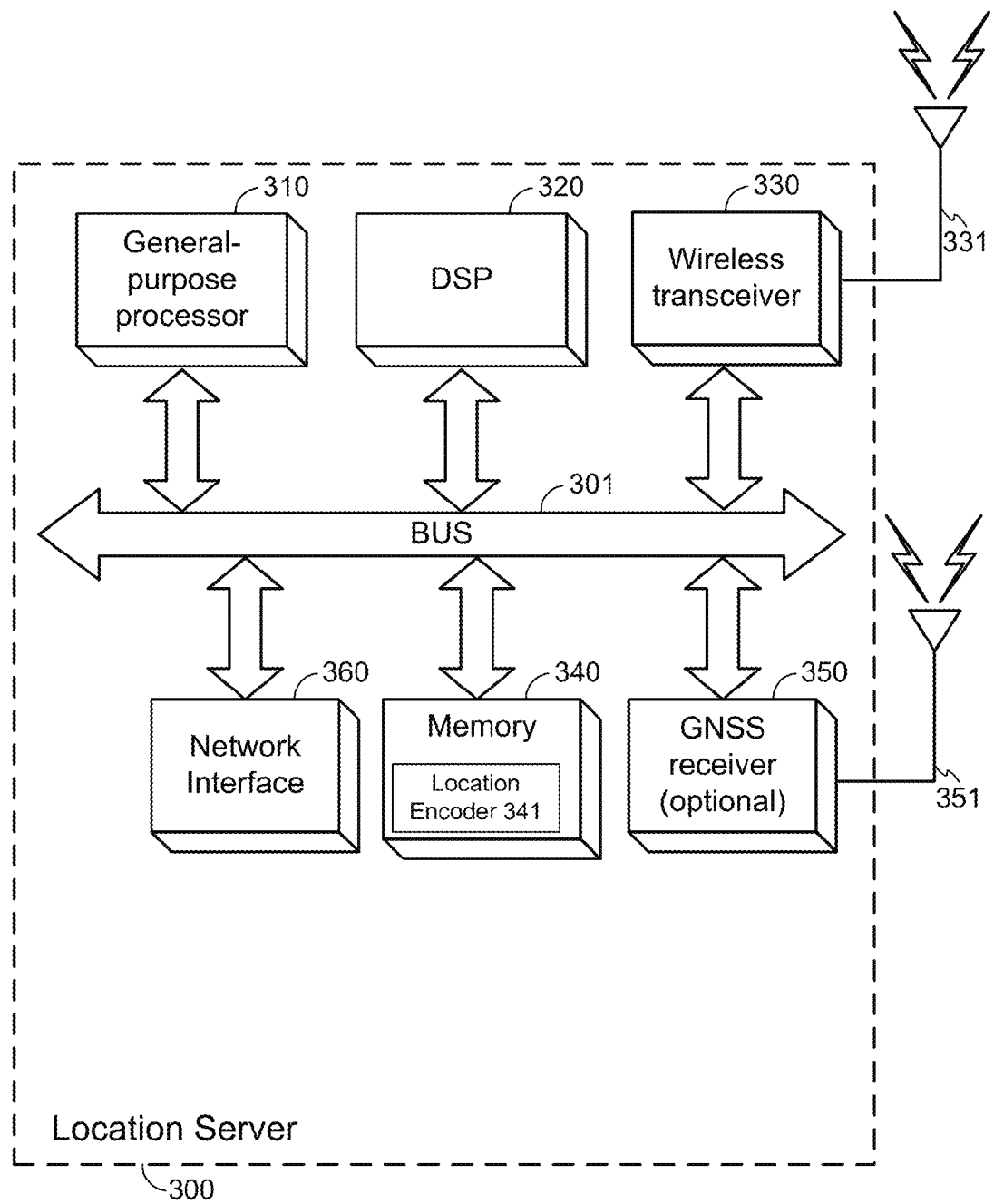
FIG. 3 is a block diagram illustrating an exemplary location server according to some embodiments.

FIG. 3 illustrates an exemplary location server 300, according to some embodiments. Examples of location server 300 may include a crowdsourcing server, location assistance server, Secure User Plane Location (SUPL) Location Platform (SLP) as defined by the Open Mobile Alliance (OMA), or a subset of a larger server providing various types of information to one or more terrestrial wireless transceivers. Location server 300 may include a GNSS receiver 350, antenna 351, a general-purpose processor(s) 310, memory 340, and a bus 301. Memory 340 may contain location encoder 341 for encoding location information about various terrestrial wireless transceivers, which may then be transmitted ultimately to client mobile devices, such as mobile device 116. Furthermore, the server 300 can further include a network interface (not shown) to communicate with a network. Location server 300 may also include wireless transceiver 330, which may enable server 300 to transmit and receive signals wirelessly via antenna 331. DSP 320 may also be included and may be configured to process the wireless signals. In some embodiments, server 300 may be interconnected to other devices and/or networks through wired means, not shown. Location server 300 may be configured to provide location information, obfuscation information, account information, and other kinds of information pertinent to mobile devices and other subscribers utilizing terrestrial wireless transceivers and other devices in a wireless network.

In some embodiments, information regarding the method of encoding to use for some or all mobile devices, which mobile devices an encoding technique applies to, cipher codes, and other encoding-related information may be provided by the location server 300 to the terrestrial wireless transceiver 200. For example, different brands of mobile devices or mobile devices from different carriers may require support of different encoding schemes.

Figure 4:
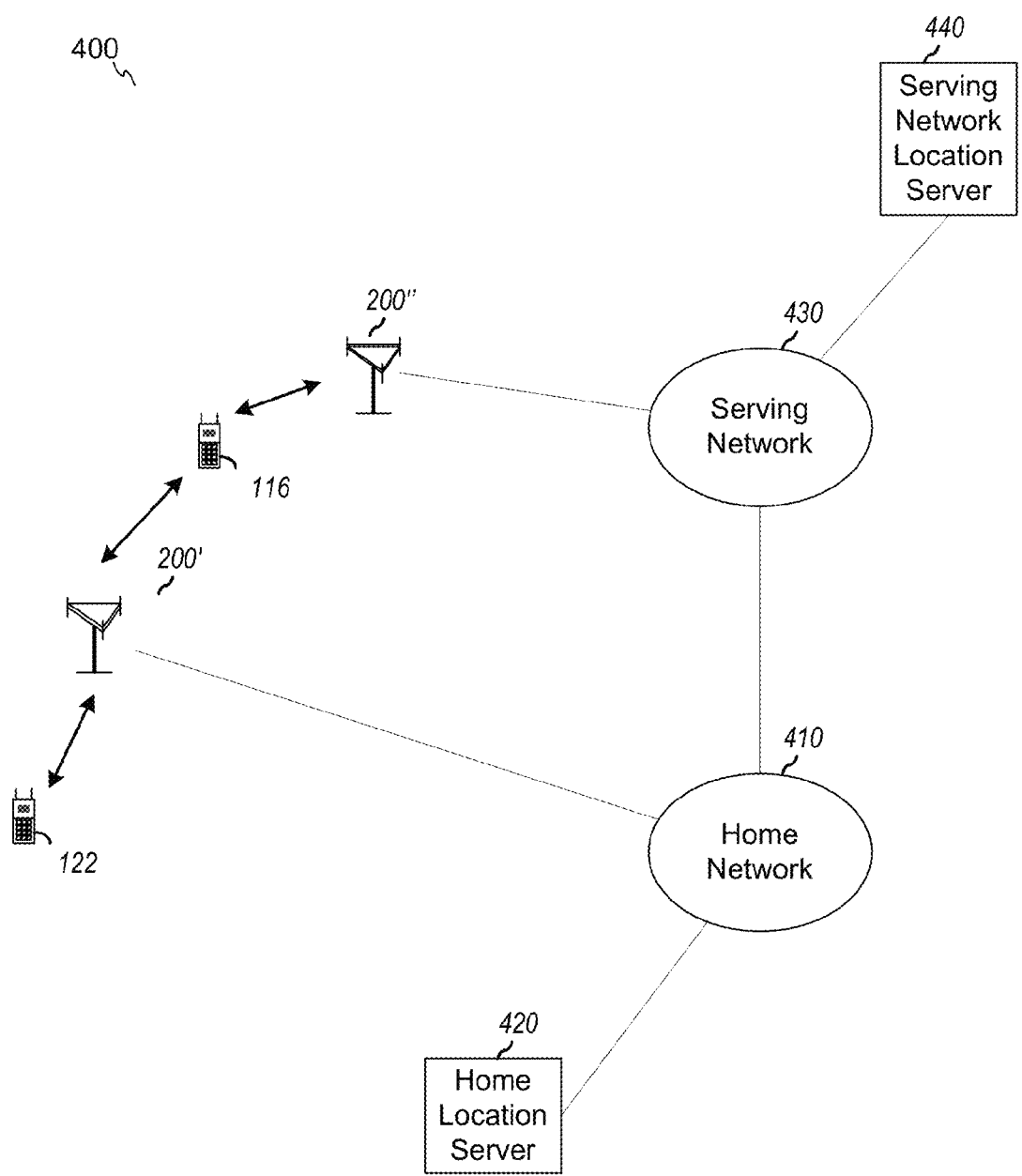
FIG. 4 is an illustration of an example wireless network environment with a home network and a serving network, showing an example relationship and context between a mobile device, one or more terrestrial wireless transceivers and one or more location servers, according to some embodiments.

Referring to FIG. 4, example wireless environment 400 illustrates an example scenario employing methods, apparatuses and systems according to the present disclosures. FIG. 4 illustrates a mobile device 116 accessing one or more terrestrial wireless transceivers 200' and 200". Mobile device 116 may be consistent with the description in FIG. 1, for example. Terrestrial wireless transceivers 200' and 200" may be consistent with the descriptions in FIG. 2, for example. Terrestrial wireless transceivers 200' and 200" each may be one or more base stations and/or access points. Terrestrial wireless transceiver 200' may be connected to a home network 410 via wired or wireless means. Terrestrial wireless transceiver 200" may be connected to a serving network 430 (e.g., a WCDMA, LTE or cdma2000 serving wireless network or some local area network consisting of APs, bridges and routers that may or may not be connected to the Internet) via wired or wireless means. Additionally, the serving network 430 may in some scenarios be connected to home network 410 for mobile device 116 either directly or via intermediate entities and systems (not shown in FIG. 4) such as the Internet. In some cases, serving network 430 and home network 410 may be the same network. Additionally, a home location server 420 can be connected to or can be part of the home network 410. Also, a serving network location server 440 may be connected to or part of serving network 430. Home location server 420 and serving network location server 440 may be consistent with the descriptions in FIG. 3, and may each be a location server, SUPL location platform (SLP), or other type of server configured to store and/or provide location information.

Still referring to FIG. 4, Mobile device 116 may have a subscription to or be within a preferred category or tier with home network 410 (which is why network 410 is designated as the "home" network in this example). Transceiver 200' may therefore provide preferred communications to mobile device 116 from home network 410. The preferred relationship may be based on a device operating on its home network (e.g., a Verizon device operating on a Verizon network) or may be based on a contractual or business relationship such as whether a device is enrolled in a particular program or service or whether a device is registered with a particular venue. The preferred status could also be based on other types of relationships or status, not mentioned above. Mobile device 116 may then obtain accurate location services from home location server 420 in some situations—e.g., when directly accessing home network 410. In contrast, for illustration purposes, the same mobile device 116 may not have a subscription or may not be within a preferred category or tier with serving network 430. Thus, if mobile device 116 is within range and communicates with terrestrial wireless transceiver 200", which is within the serving network 430, mobile device 116 may obtain less accurate location services from serving network location server 440 via serving network 430 in some scenarios. Additionally, non-preferred mobile device 122 may be within range of home network 410 but may not have a subscription or possess preferred access to home network 410. Thus, non-preferred mobile device 122 may obtain less accurate location services from home network 410. In some embodiments, exception can be made for emergency calls, where mobile device 116 in a non-preferred network (e.g. serving network 430) or non-preferred mobile device 122 in home network 410 may have access to the higher accuracy data.

In some instances, the terrestrial wireless transceiver 200' may be operated by a first service provider, while terrestrial wireless transceiver 200" may be operated by a second service provider. The first and second service providers may each be a wireless network operator, the owner or manager of some area (e.g. an indoor venue) containing the terrestrial wireless transceivers 200' and 200", respectively, a local communications service provider, a vendor for the terrestrial wireless transceivers 200' and 200", respectively, or some other entity. The first service provider may have some business relationship with the home operator of the preferred mobile device 116 or with a vendor for mobile device 116 (e.g. a vendor for the overall device or a vendor for a component of the device such as an operating system or chipset in mobile device 116). The first service provider may not have such a business relationship with respect to the non-preferred mobile device 122 or serving network 430. In this scenario, the first service provider operating the terrestrial wireless transceiver 200' may obfuscate the accurate location of terrestrial wireless transceiver 200' when transmitting the location to a non-preferred mobile device 122 roaming within home network 410. Similarly, the second service provider may obfuscate the accurate location of terrestrial wireless transceiver 200" when transmitting the location to mobile device 116, which is a non-preferred device in relation to the second service provider. The first service provider operating the terrestrial wireless transceiver 200' may also obfuscate the accurate location of terrestrial wireless transceiver 200' when transmitting the location to preferred mobile devices such as mobile device 116 if such transmission may also be received by non-preferred mobile devices such as mobile device 122 (e.g. as may occur when the location of the terrestrial wireless transceiver 200' is broadcast by terrestrial wireless transceiver 200' to a plurality of mobile devices). However, the first service provider may provide means, as described further on herein, to enable preferred mobile devices such as mobile device 116 to obtain the accurate location of terrestrial wireless transceiver 200'.

In some embodiments, terrestrial wireless transceiver 200' and/or 200" may be a base station, or alternatively a femtocell, or alternatively an access point. In some embodiments, mobile device 116 may be in communication with one type of terrestrial wireless transceiver, which may be in communication with an additional terrestrial wireless transceiver of another or the same type, which may then be in communication with network 430 or 410, and so forth. In some embodiments, terrestrial wireless transceiver 200' may be the same or different type than terrestrial wireless transceiver 200" (e.g. one may be an access point, while the other may be a base station). In some embodiments, the areas in which each of the terrestrial wireless transceivers 200' and 200" may be accessed may overlap.

Such location services may be supported using, for example, the SUPL location solution defined by OMA, and may include the transfer of assistance data from home location server 420 to mobile device 116 to enable the mobile device to acquire and measure radio signals from terrestrial wireless transceivers in the current serving network, e.g. terrestrial wireless transceiver 200' and/or from global navigation satellites (not shown in FIG. 4), such as satellites belonging to the Global Positioning System GPS) or other systems, such as the European Galileo system or Russian GLONASS system. Assistance data transferred from a location server to a mobile device may also include the locations of nearby APs and/or base stations, such as the location of terrestrial wireless transceiver 200'. As previously mentioned, the location data may be accurate for preferred mobile device 116 and may be obfuscated for a non-preferred mobile device or when mobile device 116 is on non-preferred serving network 430. The location data may instead be obfuscated for both a preferred mobile device and a non-preferred mobile device with a preferred mobile device enabled (as described later herein) to recover the accurate location data from the obfuscated location data. In some embodiments (not shown in FIG. 4), home location server 420 may be connected to serving network 430 rather than to home network 410 and may then function as a Discovered SLP (D-SLP) in providing location service to SUPL enabled terminals (SETs), which is one example of a mobile device. In some scenarios, locations of terrestrial wireless transceivers may be provided to mobile devices 116 and 122 by direct broadcast from the terrestrial wireless transceivers themselves—e.g. to reduce the amount of point to point data transferred between a location server and each mobile device 116. In such a case, the locations that are broadcast may be obfuscated and thus less accurate than the terrestrial wireless transceiver locations that may be known to a location server, e.g. home location server 420. Means to obtain the more accurate terrestrial wireless transceiver locations may then be provided to preferred mobile device 116 but not to non-preferred mobile device 122.

Additionally, a location related server (e.g., home location server 420 or serving network location server 440) may be used to assist a mobile device to make appropriate location related measurements (e.g., measurements of radio signals from base stations in the serving wireless network or measurements of various global navigation satellites) and, in some cases, determine a location for the mobile device from these measurements. In some other cases, the location related server 420 may compute the mobile device's location based on these measurements. In performing these roles, a location related server and/or mobile device may need to rely on the availability of an accurate set of terrestrial wireless transceiver locations.

In one or more arrangements, networks 410 and/or 430 can each include a wireless network subsystem, which may include one or more systems and components for providing wireless telephony and data networks, such as one or more transmitter systems, receiver systems, gateways, switches, routers, controllers, registers, billing centers, service centers, mobile switching centers, base station controllers, and/or other systems and components. These systems and components may, for example, enable a wireless network subsystem to control one or more terrestrial wireless transceivers, such as terrestrial wireless transceiver 200', which may transmit and receive radiofrequency signals to and/or from one or more mobile devices on the network(s) provided by wireless network subsystem.

In one or more arrangements, the network 410 and/or 430 can include a broadband network gateway, which may include one or more systems and components for providing wired telephony and data networks, such as one or more gateways, switches, and/or routers, as well as one or more optical, coaxial, and/or hybrid fiber-coaxial lines, one or more satellite links, one or more radio links, and/or other systems and components. These systems and components may, for example, enable a broadband network gateway to provide telephone services and/or data/Internet access to one or more user devices at various locations.

Figure 5:
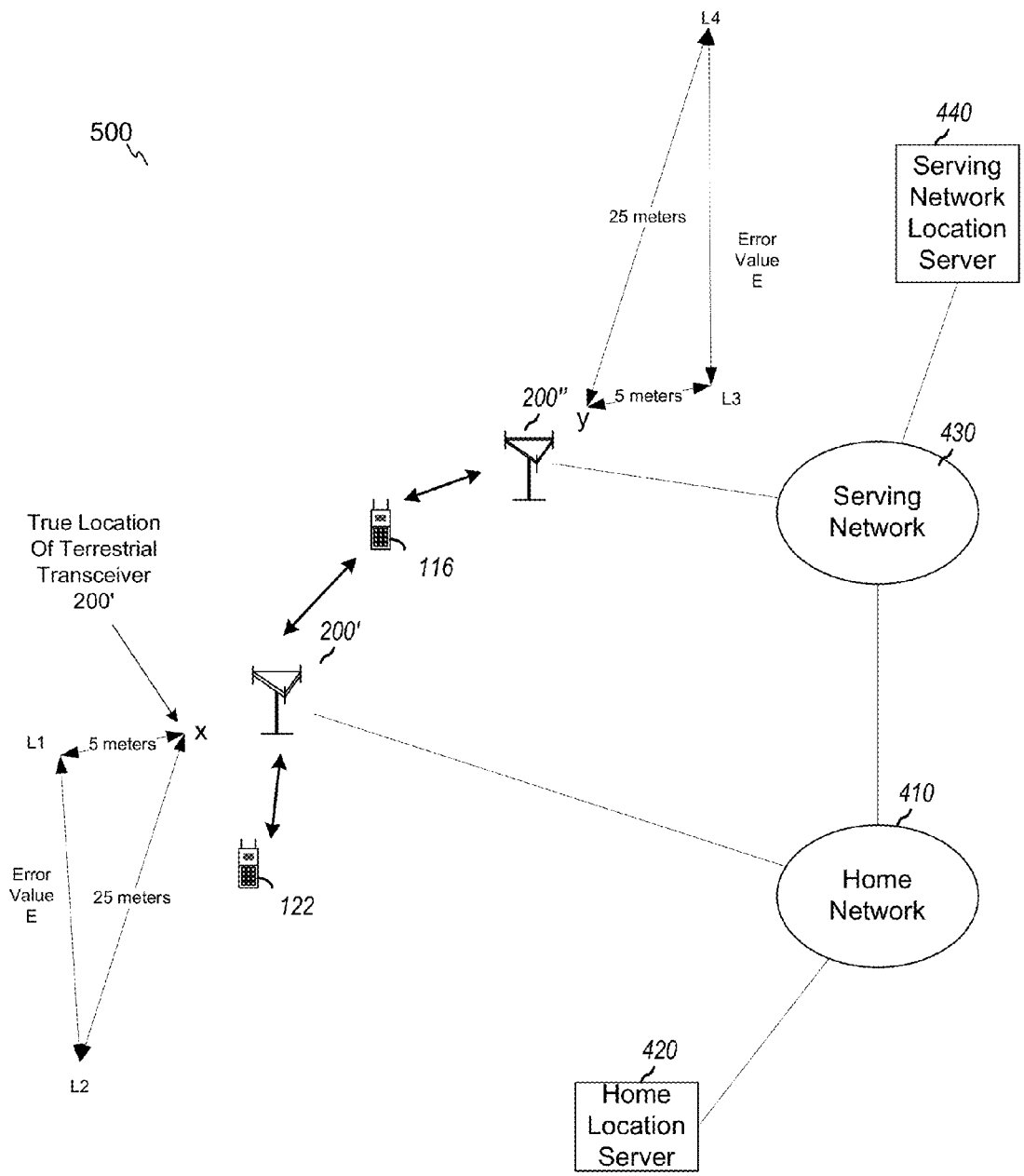
FIG. 5 is a system diagram of an example for obfuscating the locations of terrestrial wireless transceivers, according to some embodiments.

FIG. 5 illustrates an example scenario 500 of obfuscating the locations of terrestrial wireless transceivers. For example, FIG. 5 shows the true location X of terrestrial wireless transceiver 200', an accurate location estimate L1 for transceiver 200' with a 5 meter error, and an obfuscated location estimate L2 with an overall error of 25 meters that is obtained by adding an error term E to the accurate location estimate L1. Preferred mobile device 116, being a preferred device within home network 410, is able to determine the accurate location L1 by determining the error term E and removing it from the obfuscated location L2, whereas a non-preferred mobile device 122 can only obtain the less accurate location L2. Similarly, when mobile device 116 is not on home network 410 but is on serving network 430, mobile device 116 may not have a preferred status like it does in home network 410. Subsequently, when trying to obtain a location estimate of terrestrial wireless transceiver 200" while on serving network 430, mobile device 116 may receive an obfuscated location L4, while the true location of terrestrial wireless transceiver 200" is at location y. Mobile device 116 may be unable to improve its location estimate of terrestrial wireless transceiver 200" to, say, a more accurate location L3, unlike those mobile devices that have preferred status in serving network 430. This may be because mobile device 116 may not have the ability to remove any error term E that leads to obfuscated location L4 from more accurate location L3.

As illustrated in FIG. 5, a mobile device may receive data for terrestrial wireless transceiver 200'. The data can include location coordinates of the terrestrial wireless transceiver. Additionally, the location coordinates can include an error term. Furthermore, preferred mobile device 116 can determine the error term based on the data and may determine an accurate location of terrestrial wireless transceiver 200' by removing the error term from the location coordinates.

For example, a location server (e.g., home location server 420), whose primary role may be to support location for certain preferred mobile devices 116, may obtain information on the locations of certain terrestrial wireless transceivers via crowdsourcing or other conventional means and may distribute this information to the providers or operators of these terrestrial wireless transceivers who may then freely provide the terrestrial wireless transceiver locations to all mobile devices via broadcast from some or all of these terrestrial wireless transceivers. Non-preferred mobile device 122 may then benefit from these terrestrial wireless transceiver locations to the same degree as the preferred mobile devices 116. To avoid such equal benefit, an error term E may be added to any accurate location estimate such as L1 in FIG. 5 either by the source location server (e.g. home location server 420) or by the operator of the terrestrial wireless transceivers to which the accurate location estimate L1 is sent. This error addition would occur prior to broadcasting the location and hence the less accurate (obfuscated) location L2 in FIG. 5 would be broadcast instead of the more accurate location L1. This effect of the location obfuscation may be significant if the source server (e.g. home location server 420) for accurate locations such as L1 is able to locate terrestrial wireless transceivers to say 5 meters accuracy while competitor servers that may be an alternate source of terrestrial wireless transceiver locations for a non-preferred mobile device 122 are limited to say 25 or more meters accuracy. In this case, a non-preferred mobile device 122 that receives the less accurate (obfuscated) location L2 may still obtain some benefit from this location in the form of various location services (e.g. for direction finding and navigation) and may not be able to obtain the more accurate location L1 or obtain a better location than L2 from other sources. A non-preferred mobile device 122 may then receive some location service but inferior to that received by a preferred mobile device 116. In this same way, mobile device 116, while being treated as preferred within home network 410, may experience a similar treatment as mobile device 122 when mobile device 116 is on a non-preferred network, such as serving network 430.

By obfuscating terrestrial wireless transceiver locations via a deliberate coarsening of the location coordinates, a non-preferred mobile device 122 may only obtain the less accurate location. In essence, the additional error term E can be introduced into terrestrial wireless transceiver locations to deliberately coarsen the location coordinates. Furthermore, in some embodiments, the error term E may be determined by a preferred mobile device 116 to enable removal of the error and thereby access the more accurate location, or in other words, determine a corrected location with the error term removed. Additionally, there can be some randomness in how E is calculated in order to make it harder for a non-preferred device to determine E.

For example, the location of terrestrial wireless transceiver 200' may be coarsened and then broadcast with a maximum explicit accuracy of 25 meters even though the source accuracy available to the server may actually be 5 meters (as in the example in FIG. 5). The 25 meter accuracy may still provide useful service to all mobile devices (e.g., on a par with location services available using less accurate locations provided for other terrestrial wireless transceivers in other areas and other venues) and thus may not be regarded as impaired service by a non-preferred mobile device 122 or by any application or user for this device. Alternatively, the coarsening can be overridden for E911 emergency purposes.

According to some embodiments, the coarsened terrestrial wireless transceiver location can be obtained as:

Coarsened Location=Accurate Location+$E$.

The E term can be an error that can be provided to, or determined by, a preferred mobile device 116. Additionally, to make it harder for non-preferred devices to determine the E term, the E term can be different for each AP.

The error term E can be random and/or individually assigned per AP. Exemplary methods of providing an error term to a preferred mobile device 116 to enable removal from an obfuscated location may include: (i) provision from an AP or femtocell by proprietary means; (ii) provision from an associated standardized location server (e.g., home location server 420); (iii) provision using disguised information contained within standard signaling sent to preferred mobile device 116 or possibly to both preferred mobile device 116 and non-preferred mobile device 122; (iv) provision from some server associated with the preferred mobile device 116 or (v) provision as part of information or messaging used to convey the less accurate obfuscated location. The error term(s) provided using each of these alternatives may be encrypted using known methods to prevent other entities (e.g. a non-preferred mobile device 122) from obtaining the error term(s). In the case of alternative (v) above, the error term may be encoded in some way within the obfuscated location coordinates and/or within associated information such as an address (e.g. a MAC address) for the AP to which the obfuscated location applies.

A mobile device 116 or 122 may receive obfuscated AP location data and, in the case of a preferred mobile device 116, may further receive additional data to remove location errors terms. Either type of data may be sent to a mobile device via point to point or broadcast means from a wireless transceiver (e.g. 200' or 200" in FIG. 5) using signaling messages and parameters defined by IEEE 802.11 or may be sent by embedding location related messages defined according to a different protocol such as OMA LTE Positioning Protocol Extensions (LPPe) within IEEE 802.11 messages. Either set of data may originate from the sending transceiver or may originate from a remote entity (e.g, a location server such as a SUPL SLP) that may have transferred the data to the sending transceiver for onward transfer via either point to point or broadcast means to a mobile device. In some alternative embodiments, either set of data may be sent by a remote entity such as a SUPL SLP to a mobile device using such protocols as SUPL User plane Location Protocol (ULP) and/or LPPe.

FIG. 6 illustrates an exemplary method 600 for receiving obfuscated locations of terrestrial wireless transceivers (e.g., terrestrial wireless transceiver 200, 200', 200") and for recovering the accurate locations from the obfuscated locations at a preferred mobile device.

At 605, a mobile device can receive data from a terrestrial wireless transceiver (e.g., terrestrial wireless transceiver 200)—e.g. via broadcast using MBMS or IEEE 802.11 supported WiFi broadcast. The mobile device can also receive the location of the AP or femtocell from the AP or Femtocell. Alternatively, the mobile device can also receive the location of the terrestrial wireless transceiver from a location server such as an SLP or PDE, therefore the obscuring can happen at different locations. The data can include location coordinates of the transmitting access point and possibly location coordinates of other nearby access points. The location coordinates for each access point can include an error term. The exemplary method illustrated by FIG. 5 can be an example of obfuscating the locations of terrestrial wireless transceiver 200 by adding an error term E to the location coordinates. As previously mentioned, the error term E can be random and/or individually calculated and assigned per AP. Exemplary methods of providing the error term to the mobile devices can include the alternatives (i) to (v) described previously herein.

At 610, the mobile device can determine the error term based on the data received in 605. In some instances, the error term E can be determined based on a unique identifier (e.g., MAC address, cell ID, network ID, provider ID) for the terrestrial wireless transceiver that provides the data in 605 and may include the use of transformation, permutation, and/or scaling in the determination. FIGS. 7A-F further describe examples of determining the error term E based on these methods.

At 615, the mobile device can determine an accurate location of the terrestrial wireless transceiver by removing the error term from the location coordinates received in 605. By removing the error term E, which can be determined at 610, from the coarsened location, preferred mobile device 116 can determine the accurate location of a terrestrial wireless transceiver, e.g. transceiver 200'. In some embodiments, the mobile device may be consistent with the descriptions in FIG. 1. Thus, the methods described in flowchart 600 may be implemented by any and all of wireless receiver 131, processor 111, DSP 121 and memory 161, according to implementations readily apparent to those with skill in the art.

FIGS. 7A-F illustrate exemplary methods for determining the error term E, as previously discussed at 610. The steps in FIGS. 7A-F may be performed in any combination and/or in any order or individually. The exemplary methods in FIGS. 7A-F may be performed by a preferred mobile device 116 to determine the error term E in association with performing the method 600 in FIG. 6 to obtain accurate location coordinates from obfuscated location coordinates. Some of the methods in FIGS. 6 A-F may also be performed by a location server, access point or femtocell or by some other entity to determine an error term E in order to convert accurate location coordinates for an AP or femtocell into less accurate obfuscated location coordinates. In this case, any reference in the description below to the use of data received by a mobile device would be replaced by use of the same data known already by the location server, AP, femtocell or other entity that is obtaining the error term. The determination of the error term E for the location of a particular AP or femtocell by a preferred mobile device 116, location server, AP, femtocell or other entity must necessarily produce the same error value in order to allow an original accurate location to be recovered from an obfuscated location. Hence the same method and same data may be used in the determination.

Figure 7A:
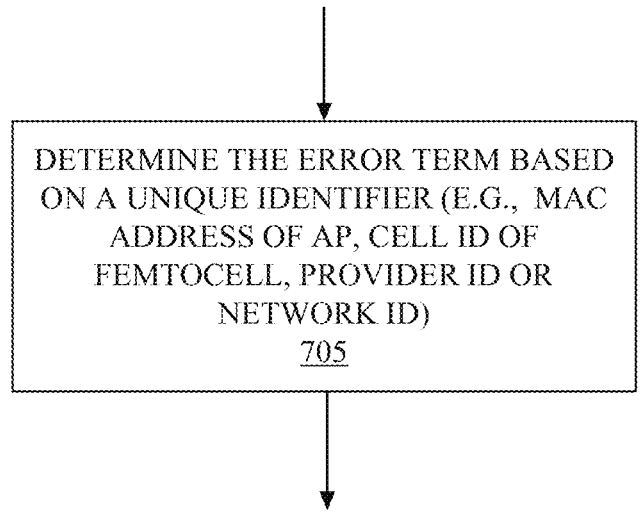
FIGS. 7 A-F are exemplary flowcharts for determining an error value, according to some embodiments.

At 705 in FIG. 7A, in one or more arrangements, the data received at 605 can include a unique identifier associated with the access point that provides the data, and wherein the error term is further determined based on the unique identifier. Unique identifiers can include, but are not limited to, the MAC address of terrestrial wireless transceiver, e.g., an access point, the cell ID of a terrestrial wireless transceiver 200, e.g., a femto cell, the provider ID or the network ID for the provider or network, respectively, for the access point or femtocell. Additionally, the unique identifier may be a combination of other identifiers that may not all be unique; for example, SID/NID/BSID where just SID or just BSID may not be unique.

For example, the error term E may be determined from some function of the address and/or ID of a terrestrial wireless transceiver (e.g., the 48 bit MAC address for a WiFi AP). For example, this determination may include use of a known scaling factor (e.g., such as 25 meters) which can be hardcoded in the mobile device or downloaded by the mobile device from a server. The determination may include a hashing or ciphering of some or all bits in the terrestrial wireless transceiver address or ID—e.g., employing a secret ciphering key known only to a preferred mobile device 116.

Since a location is normally a 2 or 3 dimensional quantity (e.g., latitude, longitude and optionally altitude), the error term E may need to be 2 or 3 dimensional—e.g., may need to comprise 2 or 3 separate scalar values. The separate scalar values may be obtained via separate ciphering or transformation of bits. For example, the separate scalar values of the error term E may be obtained from some ciphering or transformation of bits in the address or identity for the terrestrial wireless transceiver—e.g., with high order bits ciphered, hashed and/or otherwise transformed and then used as an error term for longitude and low order bits ciphered, hashed and/or otherwise transformed and then used as an error term for latitude.

To illustrate this example, the method may determine the error term E based on the MAC address of a terrestrial wireless transceiver and the scaling factor. The error term E can be removed from the coarsened location of the terrestrial wireless transceiver to determine the accurate location of the terrestrial wireless transceiver.

In some instances, when the error term is determined based on a unique identifier corresponding to a MAC address, the method may determine one or more binary values using the MAC address and multiply the one or more binary values by a known scaling factor in order to determine the error term. For example, separate error terms may be determined using the MAC address for an x-coordinate (e.g., corresponding to longitude) and for a y-coordinate (e.g., corresponding to latitude). In one example, all the even bits of the MAC address may be used to determine the error term E in the x-coordinate, while all the odd bits of the MAC address may be used to determine the error term E in the y-coordinate.

Additionally, a z-coordinate may be determined using the MAC address, according to an embodiment. For example, the 0th, 3rd, 6th, bits and so on in the MAC address may be used to determine the x-coordinate, the 1st, 4th, 7th bits and so on may be used to determine the y-coordinate, and the 2nd, 5th, 8th bits and so on may be used to determine the z coordinate.

As an example, assume that the 48 bit MAC address of an AP in hexadecimal form is 8CA500000000 and that the set of even bits are used to determine an error term for an x-coordinate and the set of odd bits are used to determine an error term for a y-coordinate. The set of even bits in hexadecimal form is AC0000 and the set of odd bits is 230000 (where even bits are assumed to start at the highest order bit). Each of these bit strings can be converted to a signed binary (or hexadecimal) fraction between −1 and $(223-1)/223$ by treating each string as a two's complement integer which is then divided by $223$. This fraction can then be multiplied by a scaling factor such as 25 meters. The result using the even bits is −16.4 meters and using odd bits is 6.8 meters. The accurate x-coordinate (when converted to a representation in meters) may then be obfuscated by subtracting 16.4 meters while the accurate y coordinate may be obfuscated by adding 6.8 meters. This obfuscation may be performed by a source location server (e.g. SLP 142) or by an AP before broadcasting the obfuscated location. The recipient preferred mobile device 116 may determine the same errors terms using the MAC address of the AP and perform the reverse addition or subtraction to obtain the accurate coordinates. A non-preferred mobile device 122 may not be aware of the obfuscation operation and not be able to obtain the accurate location coordinates. However, the obfuscation example here may be further extended using ciphering (or some other transformation of bits). For example, the 48 bits in the MAC address of the AP may first be mapped to a different set of 48 bits making use of a ciphering key known to the AP and to a preferred mobile device 116 but not to a non-preferred mobile device 122**. After the bits in the MAC address have been ciphered, the bits may be used to determine error terms for x and y coordinates using odd and even bits as just described.

In another embodiment, the error term E may be obtained from ciphering of the bits making up a cell ID in the case of a terrestrial wireless transceiver 200. When the unique identifier is a cell ID, the method may further determine one or more binary values using the cell ID and multiply the one or more binary values by a known scaling factor in order to determine the error term. The determination may be similar to or the same as that described above for determining an error term from an AP MAC address.

In another embodiment, the identifier may be the serving network ID or provider ID associated with an access point or femtocell. The network ID or provider ID may be included in the determination of location for terrestrial wireless transceivers. For example, determining the error term E may be based on the serving network ID or the provider ID. The serving network ID or provider ID may be obtainable by a mobile device (e.g. may be broadcast by an AP or Femtocell) and may be a sequence of decimal digits, a binary string, a sequence of characters or some other identifier that can be converted to a bit string (e.g. in the case of a sequence of decimal digits by converting the resulting decimal number into binary or in the case of a sequence of characters by encoding each character in binary and then converting the sequence of binary values into a single bit string). In some cases, a binary 32 bit or 128 bit IP address assigned to a mobile device by a serving network may contain a fixed network (or network and host) portion that can be used as a network ID. Similar techniques previously discussed in relation to other unique identifier (e.g., MAC address) may then be used to determine the error term E using the bit string obtained from the network ID or provider ID. Since the network ID or provider ID may be the same for many APs and/or femtocells, an error term determined in this manner may be the same for many APs and/or femtocells which may allow a non-preferred mobile device 122 or other non-preferred entity (e.g. a location server) to infer the error term from the repetition of nearly the same overall error value in many obfuscated AP and/or Femtocell locations. To overcome this potential limitation, the network ID or server ID may be combined with other data such as certain bits in an AP MAC address or Femtocell cell ID.

Figure 7B:
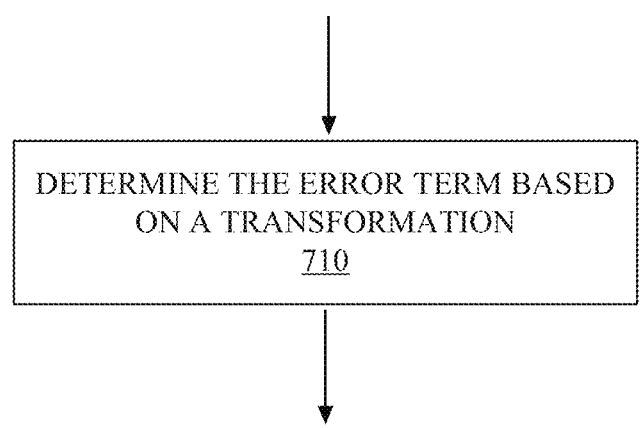

At 710 in FIG. 7B, in one or more arrangements, the error term E may further be determined based on a transformation. For example, the error term E may be determined by transforming bits in the location coordinates provided (e.g. via broadcast) by an AP or Femtocell. In some instances, the transformation may include transforming lower order bits associated with a precision in the location coordinates equal to the magnitude of error to be introduced (e.g., of say 25 meters). For example, when the precision of a binary encoded location x coordinate or y coordinate is exactly 1 meter at the least significant bit level, the lowest order 6 bits may encode a portion of the x or y coordinate in the range 0 to 63 meters (where 0 meters may be encoded by binary 000000 and 63 meters by binary 111111). These 6 least significant bits may then be converted to a different set of 6 bits via some known but non-disclosed transformation or using ciphering to introduce an error term whose expected or typical value may represent a portion of the coordinate equal to around 31 meters (or approximately half the coordinate range encoded by the 6 bits). For example, in the case of transforming just the 2 lowest order bits the following transformation may be used in a mobile device to recover the original accurate location: 00→10, 01→11, 10→01, 11→00. The corresponding transformation needed to produce the error initially (e.g. at server or AP) would be the reverse of this namely: 00→11, 01→10, 10→00, 11→01. In another embodiment, least significant bits may be ciphered in a manner dependent on other bits and/or a known secret key and/or the AP address or cell ID. Ciphering and transformation of bits may be synonymous in some implementations and, for N (N>=1) least significant bits, may employ a mapping of N bit strings to N bit strings where the mapping is equivalent to a permutation of the 2N possible binary values in order to be reversible. The benefit of using a transformation is that additional data beyond the already provided location coordinates may not be needed except possibly for a ciphering key that may be configured in advance in a preferred mobile device 116**. Note that when a transformation is used, the error term E may only be implicitly determined since the transformation may convert directly between accurate and obfuscated location coordinates.

When the determination is done by transformation, determining the error term may further include storing, by the mobile device, a known ciphering key and altering bits associated with the received data, wherein the altering is based on the known ciphering key.

Figure 7C:
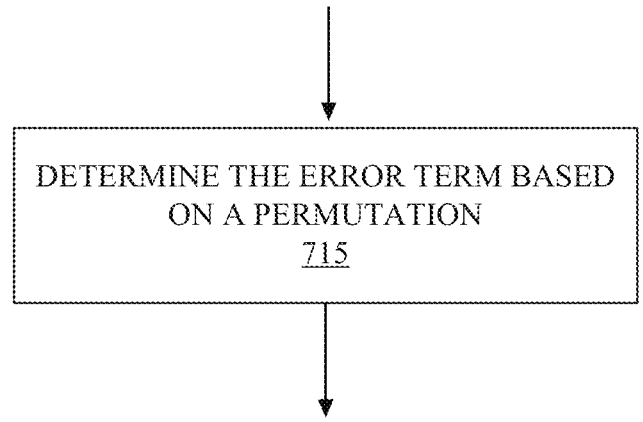

At 715 in FIG. 7C, in one or more arrangements, the error term E may further be determined based on a permutation. For example, the data may further include a second location associated with a second access point, and the mobile device may further determine a mapping table, where the mapping table includes association information about the first access point and the second access point. Additionally, the method may further calculate the error term based on the mapping table and the second location. For example, the accurate location of the first access point may be the second location based on the mapping table.

According to some embodiments, locations of terrestrial wireless transceivers 200 may be obfuscated by permuting the real locations of the terrestrial wireless transceivers. In some instances, permuting may be accomplished using a permutation matrix among nearby APs such that each AP actually transmits the location of another nearby AP location. The permutation matrix may be synonymous with a mapping table and may be determined by a preferred mobile device 116 as described below.

For example, in a three APs (e.g., AP A, AP B, AP C) scenario where each AP sends its own location in an obfuscated form, AP A can send the location of AP B, AP B can send the location of AP C, and AP C can send the location of AP A. In the permuting example described, AP A, AP B and AP C may be in close proximity to each other resulting in location errors that are not extreme. Furthermore, while the exemplary method is shown with three APs, in some embodiments, the permuting can be accomplished with any number of APs, base stations and/or femtocells. For example, in one embodiment, an AP may provide the accurate location for terrestrial wireless transceiver 200, and vice-versa. In still other embodiments, an AP may provide the location of a base station, terrestrial wireless transceiver 200 may provide the location of the AP, and the base station may provide the location of terrestrial wireless transceiver 200. The permutation can be accomplished as long as two or more permutated locations are broadcasted.

The permutation can be known to the preferred mobile device 116 and/or determined using properties of various terrestrial wireless transceivers 200. Permuting locations may be valid when preferred mobile device 116 is able to receive a complete set of terrestrial wireless transceiver locations from a server (e.g., home location server 420), and/or combination of other terrestrial wireless transceivers in the network. For example, a complete set of AP locations can be contained in one message or in a sequence of associated messages sent at the same time. In this case, properties of either the locations or the AP MAC addresses may be used to determine the permutation.

For example, if there are n (n>1) APs and the longitude coordinates of the APs when ordered from extreme West to East are L1, L2 . . . Ln, corresponding to APs 1, 2 . . . n, respectively, before permutation, then the permutation may be to assign the location of AP 1 to AP 3, the location of AP 2 to AP 4 and so on. Based on this example, the permutation can assign the location of AP n−1 to AP 1 and the location of AP n to AP 2. Similar permutation methods can be used based on the latitude coordinates of the APs. In order to obtain the correct AP locations, a preferred mobile device 116 would perform the reverse permutation from the AP locations received which in the previous example could be to first order the APs from West to East with regard to their longitude coordinates in the form 1*, 2*, . . . n*. The mobile device would then recover the location of AP 1* from the provided location of AP 3*, the location of AP 2* from the provided location of AP 4* and so on up to recovering the location of AP n−1* from the provided location of AP 1* and the location of AP n* from the provided location of AP 2*.

In another embodiment, the latitude, longitude and possibly altitude coordinates of a set of APs may be permuted independently of one another. For example, if there are n (n>1) APs with longitude coordinates L1, L2 . . . Ln when ordered from west to east and latitude coordinates LA1, LA2 . . . LA2 when ordered from south to north, the longitude coordinates may be permuted using a permutation P1 and the latitude coordinates may be permuted using a permutation P2. For example, P1 may assign L1 to the AP with longitude L3, L2 to the AP with longitude L4 etc. as in the earlier example, and P2 may assign LA1 to the AP with latitude LA3, LA2 to the AP with latitude LA4 etc. Although P1 and P2 are similar permutations, they may be independent because the ordering of the n APs according to longitude may be different to and independent of the ordering of the APs according to latitude. In other examples, P1 and P2 may be dissimilar permutations.

Alternatively, according to another embodiment, when the MAC addresses ordered from lowest to highest binary value are MAC1, MAC2, . . . MACn, which corresponds to APs 1, 2, . . . n, respectively, before permutation, then the permutation may instead be to assign the location of AP 0.1 to AP 2, the location of AP 2 to AP 3 and so on up to assigning the location of AP n to AP 1. The reverse permutation performed at a preferred mobile device 116 to recover the correct AP locations may be to order APs according to their MAC addresses as above and to assign the provided location of AP 2 to AP 1, the provided location of AP 3 to AP 2, etc.

In some other embodiments, location coordinates may be permuted using properties of both the location coordinates and MAC addresses. For example, latitude coordinates may be permuted among a set of n (n>1) APs using an ordering of the n APs based on their MAC addresses, whereas longitude coordinates may be permuted among the n APs using an ordering of the APs based on their longitude coordinates (or based on their latitude coordinates).

In some instances, a combination of both error term and permutation methods may be possible (e.g., use of an error term for APs with few or no nearby neighbors, and use of permutation when many APs are nearby to each other).

While several exemplary methods are shown, a person skilled in the art may utilize other known permutation methods to coarsen the location of the APs and use similar permutation matrix to determine the error value E.

Figure 7D:
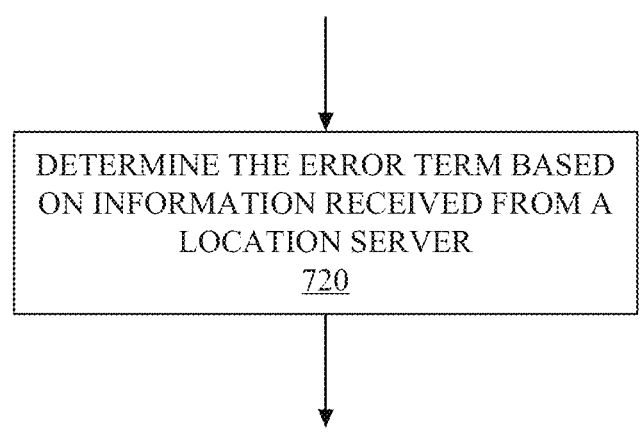

At 720 in FIG. 7D, in one or more arrangements, determining the error term may further include receiving information from a location server associated with the preferred mobile device 116 and determining the error term based on the received information. For example, the location server may be home location server 420. The information may comprise the error term itself or information from which the error term can be determined or determined in part—e.g. a ciphering key. Additionally, the information may indicate for which terrestrial wireless transceiver locations have been obfuscated, thereby enabling a preferred mobile device 116 to determine when to apply the method 600 of FIG. 6.

According to some embodiments, in order for a preferred mobile device 116 to reliably know when terrestrial wireless transceiver location coordinates had been coarsened or obfuscated, a provider ID for the terrestrial wireless transceiver locations may also be provided. The provider ID may be provided by a location server (e.g., home location server 420) or by any type of terrestrial wireless transceiver along with an understanding that the terrestrial wireless transceiver locations associated with some provider IDs have been coarsened or obfuscated.

For example, preferred mobile device 116 may be configured (e.g., by home location server 420, by a manufacturer of mobile device 116 or by a manufacturer of a component of mobile device 116) with a set of preferred provider IDs and may be informed by a location server (e.g., home location server 420) of a preferred provider ID associated with provided AP locations. Additionally, a particular part of a configured provider ID (e.g., a certain initial or final character for a provider ID that is expressed as a character string) may be assigned to indicate whether or not terrestrial wireless transceiver locations have been obfuscated. Furthermore, the configured provider ID may indicate the method of obfuscation (e.g., error term E derived using ciphering, error term E derived from MAC addresses).

In some other embodiments, a preferred mobile device 116 may be informed by a location server (e.g. home location server 420) that obfuscation of terrestrial wireless transceiver locations are being used at a certain location— e.g. within a certain shopping mall or in a certain airport— and that the preferred mobile device 116 needs to employ a method such as method 600 in FIG. 6 to obtain the accurate terrestrial wireless transceiver locations. The location server may indicate the location at which obfuscation is being used in various ways such as (i) using a geographic area description for the location (e.g. a circle, ellipse or polygon), (ii) by indicating a WiFi Service Set Identification (SSID) or set of SSIDs that are broadcast from APs whose locations have been obfuscated, (iii) by indicating an address or identifier for a location server local to the area that a preferred mobile device 116 may become aware of or interact with within the area and/or (iv) by indicating the addresses of some terrestrial wireless transceivers that are within the area.

According to some embodiments, an uncertainty for a provided terrestrial wireless transceiver location could be included with the terrestrial wireless transceiver location (e.g. that is broadcast by the terrestrial wireless transceiver to which it applies) with an understanding that a small uncertainty (e.g., 5 meters) signifies no coarsening or obfuscation of the location whereas a larger uncertainty (e.g., 25 meters or more) signifies potential coarsening or obfuscation. In the latter case, a preferred mobile device 116 that receives the location may determine whether obfuscation was actually used using one the methods described earlier—e.g. using a provider ID. The benefit of enabling accurate (non-obfuscated) locations to be provided and indicated via a small uncertainty is that improved location service may then be provided to all mobile devices (i.e. preferred and non-preferred mobile devices) at certain locations that are deemed important for all users—e.g. such as in the immediate vicinity of a gate at an airport or nearby to a fire exit in a large building.

Figure 7E:
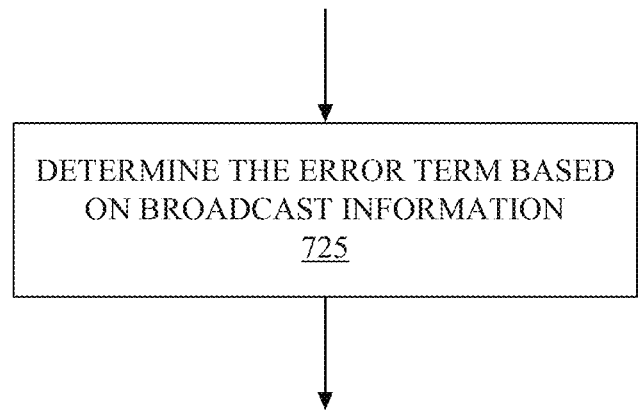

At 725 in FIG. 7E, in one or more arrangements, determining the error term can further include receiving broadcast information from the terrestrial wireless transceiver and determining the error term based on the broadcast information. The broadcast information may include one or more of the obfuscated location of the terrestrial wireless transceiver, the address (e.g. MAC address) of the terrestrial wireless transceiver, a provider ID for the terrestrial wireless transceiver location, a network ID, obfuscated locations for other (e.g. nearby) terrestrial wireless transceivers, addresses (e.g. MAC addresses) for other (e.g. nearby) terrestrial wireless transceivers, cell IDs for (e.g. nearby) femtocells and/or other information. A preferred mobile device 116 that receives this information may use it to help determine an error term in a provided obfuscated location for the broadcasting terrestrial wireless transceiver and/or for another (e.g. nearby) AP or femtocell as described previously with respect to steps 705 through 720.

Figure 7F:
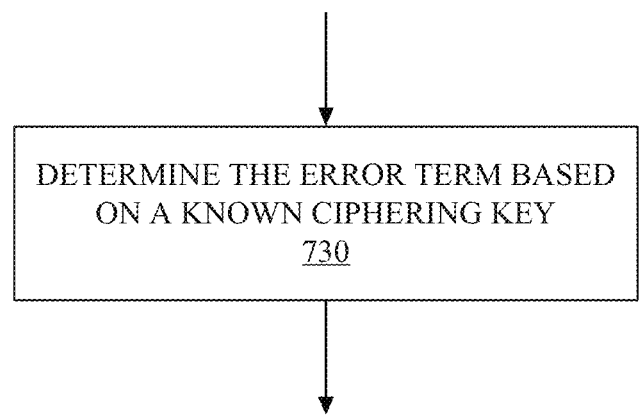

At 730 in FIG. 7F, in one or more arrangements, determining the error term can further include storing, by the mobile device, a known ciphering key and altering bits associated with the received data, wherein the altering is based on the known ciphering key. The ciphering key may be configured in or provided to a preferred mobile device 116 by a location server (e.g. home location server 420) and may be used to help determine an error term using an AP address or femtocell cell ID as described earlier for step 705, or help derive an error term from location coordinates (e.g. less significant bits in location coordinates) as described for step 710.

As illustrated in FIGS. 7A-F, the determination of the error value can be based on any of the combination of the techniques described in 705, 710, 715, 720, 725 and/or 730.

It should be noted that while the methods described previously with reference to FIGS. 5, 6, and 7A-F may be used to provide more accurate locations for terrestrial wireless transceivers to a preferred mobile device 116 than to a non-preferred mobile device 122, the same methods may be used to provide more accurate locations for other entities such as Bluetooth APs, infrared beacons, satellite positioning system (SPS) pseudolites such as associated with the Global Positioning System (GPS) and other wireless transmitters and beacons. Furthermore, the methods may also be used to provide more accurate locations to a preferred mobile device 116 for other items such as points of interest on a map, particular locations in a town, city or inside a building. In such cases, obfuscated locations may be provided to all mobile devices (e.g. via broadcast) that each contain an error term with a preferred mobile device 116 being enabled by the methods described previously to determine and remove the error term in order to determine more accurate locations.

Figure 8:
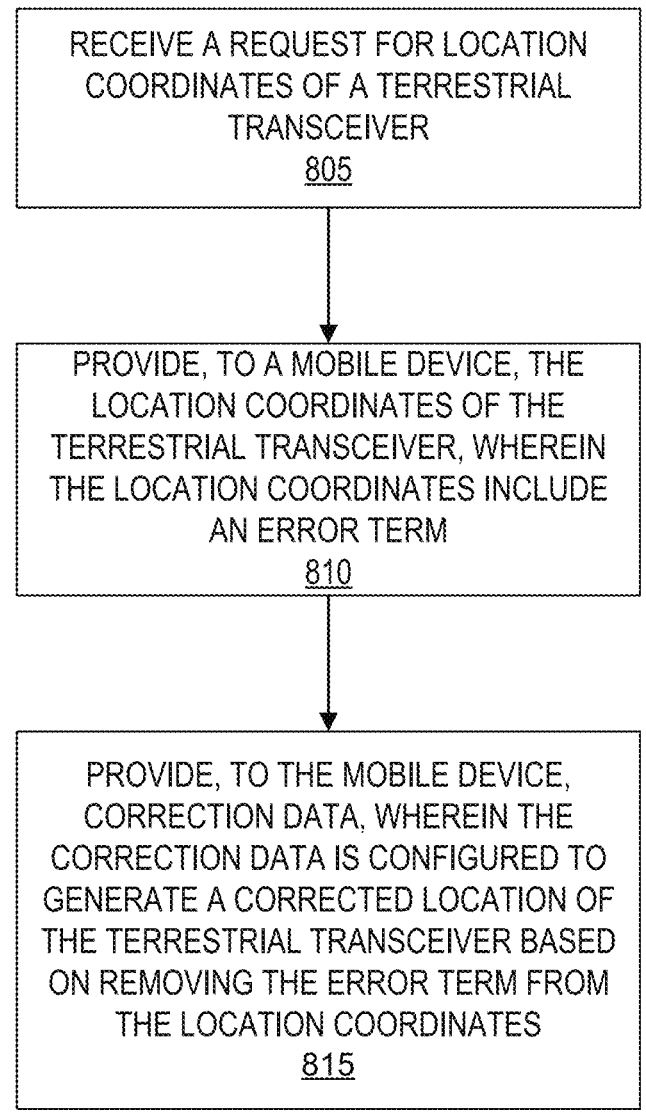
FIG. 8 is an exemplary flowchart for providing obfuscated location information by a terrestrial wireless transceiver, according to some embodiments.

Referring to FIG. 8, flowchart 800 illustrates an example method for providing an obfuscated location of a terrestrial wireless transceiver to a mobile device, along with means for the mobile device to remove the error term and determine a corrected location. Examples of a mobile device include any of the descriptions about a mobile device discussed herein, including, for example, FIG. 1. At block 805, the method may include receiving a request for location coordinates of a terrestrial wireless transceiver. The location coordinates may be consistent with any of the descriptions about location coordinates for a terrestrial wireless transceiver, including that the location coordinates may be expressed in two or three dimensions using any suitable coordinate system and may include an indication of the error in the location coordinates. Examples of terrestrial wireless transceivers may include APs, femto cells, and base stations, and may be consistent with any of the descriptions about terrestrial wireless transceivers or terrestrial wireless transceivers described herein, the two terms of which are used interchangeably herein. In some implementations, block 805 may not occur and location coordinates may be provided to a mobile device without the need for a request (e.g. may be broadcast to all mobile devices).

At block 810, the location coordinates of the terrestrial wireless transceiver may be provided to the mobile device, wherein the location coordinates include an error term. The error term may produce an obfuscated location of the terrestrial wireless transceiver, if a mobile device tries to calculate the position of the terrestrial wireless transceiver without removing the error term. Examples and further details about the error term may be consistent with any of the examples of descriptions of an error term described within the present disclosures, including, for example, the descriptions in FIGS. 4, 5, 6, and 7A-F.

At block 815, correction data may be provided to the mobile device, wherein the correction data, when applied properly to the location coordinates, is configured to generate a corrected (i.e. more accurate) location of the terrestrial wireless transceiver based on removing the error term from the location coordinates. Examples of the correction data may be consistent with the types of data described in FIGS. 7A-F that are used to remove or account for the error term. For example, the correction data may include a unique identifier (e.g. MAC address of AP, cell ID of femtocell, or provider ID or network ID), data associated with a transformation and consistent with the descriptions in FIG. 7B, data associated with a permutation and consistent with the descriptions in FIG. 7C, information received from a location server and consistent with the descriptions in FIG. 7D, broadcast information that is consistent with the descriptions in FIG. 7E, and/or a known ciphering key consistent with the descriptions in FIG. 7F. In some implementations, the correction data in block 815 may be part of information concerning location coordinates sent in block 810—e.g. may be an address for the terrestrial wireless transceiver such as a MAC address that is included within a message sent in block 810 that may also carry location coordinates.

In some embodiments, the method of FIG. 8 may be implemented by the terrestrial wireless transceiver itself. For example, the terrestrial wireless transceiver may transmit its location coordinates while including the error term, and may also transmit the correction data. In some embodiments, the terrestrial wireless transceiver itself may generate the correction data. In other embodiments, a location server associated with and/or within the same network as the terrestrial wireless transceiver may generate the correction data, which may then be transmitted to the terrestrial wireless transceiver or to some other transceiver through wireless or wired means, which may then be transmitted to the mobile device. Examples of a location server may include any of the descriptions about location servers discussed herein, including, for example, FIG. 3. In some embodiments, the location server may also provide the location coordinates of the terrestrial wireless transceiver. The location server may transmit the location coordinates to the terrestrial wireless transceiver or to some other transceiver, which may then provide the location coordinates to the mobile device.

Figure 9:
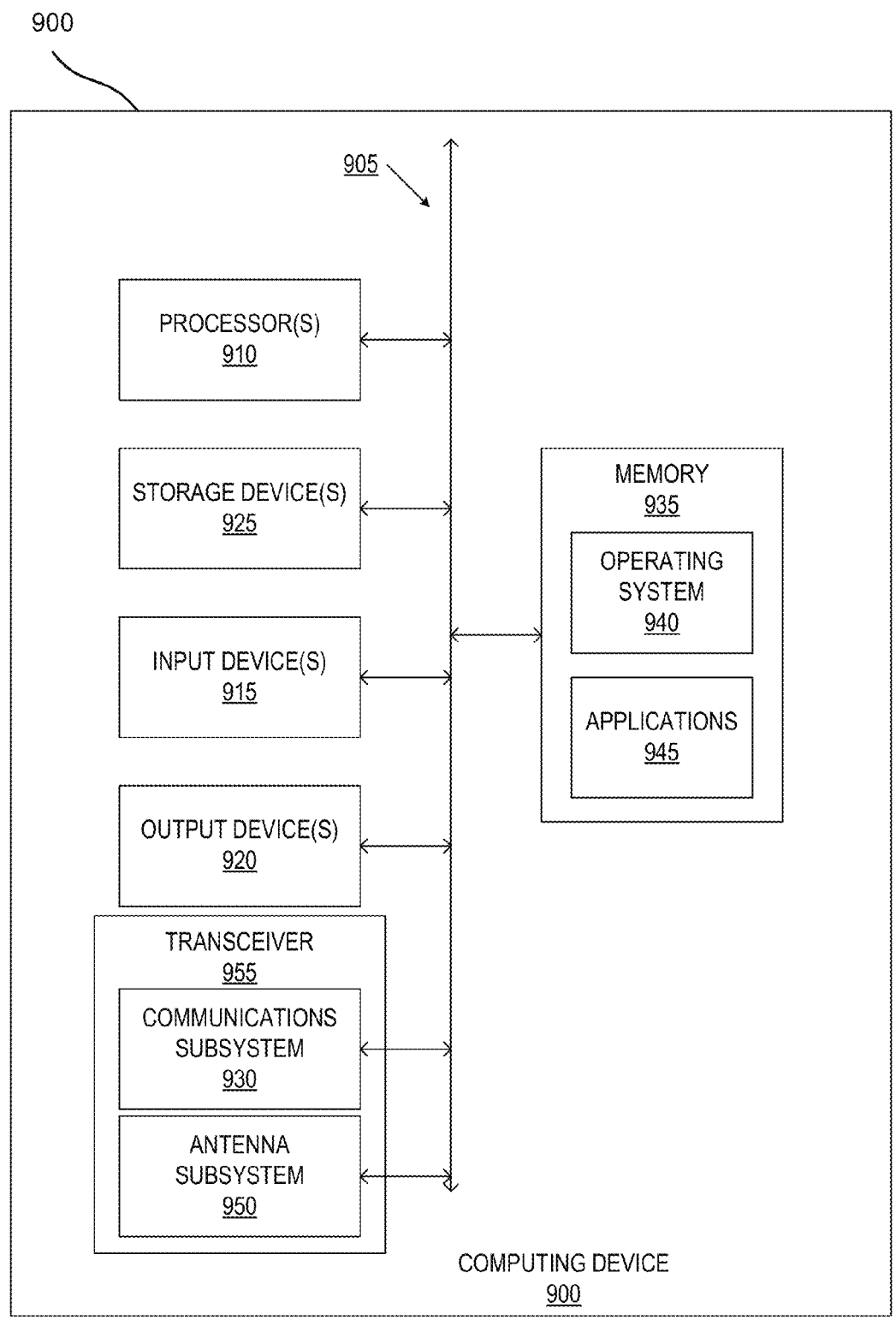
FIG. 9 is an exemplary computer system of various embodiments.

An example of a computing system in which various aspects of the disclosure may be implemented is now described with respect to FIG. 9. The computing system may exemplify any of mobile devices 116, 122 as well as terrestrial wireless transceivers 200, 200', 200", and location servers 300 and 420, as referenced herein elsewhere. According to one or more aspects, a computer system as illustrated in FIG. 9 may be incorporated as part of a computing device, which may implement, perform, and/or execute any and/or all of the features, methods, and/or method steps described herein. For example, computer system 900 may represent some of the components of a mobile device. The mobile device can be connected to a wireless interface and/or a network interface. A mobile device may be any computing device with an input sensory unit, such as a camera and/or a display unit. Examples of a mobile device include but are not limited to video game consoles, tablets, smart phones, and mobile devices. In one embodiment, the system 900 is configured to implement the mobile device 116 described above. FIG. 9 provides a schematic illustration of one embodiment of a computer system 900 that can perform the methods provided by various other embodiments, as described herein, and/or can function as the host computer system, a remote kiosk/terminal, a point-of-sale device, a mobile device, a set-top box, and/or a computer system. FIG. 9 is meant only to provide a generalized illustration of various components, any and/or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). In one embodiment, the bus 905 can be used for the processor 111 to communicate between cores and/or with the memory 161. The hardware elements may include one or more processors 910 (e.g., processor 111), including without limitation one or more general-purpose processors and/or one or more special-purpose processors (such as digital signal processing chips, graphics acceleration processors, and/or the like); one or more input devices 915, which can include without limitation a camera, a mouse, a keyboard, a touch sensitive screen and/or the like; and one or more output devices 920, which can include without limitation a display unit, a printer and/or the like.

The computer system 900 may further include (and/or be in communication with) one or more non-transitory storage devices 925, which can comprise, without limitation, local and/or network accessible storage, and/or can include, without limitation, memory 161, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 900 might also include a communications subsystem 930, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. According to one embodiment of the present invention, the receiver 131 and GNSS receiver 171 can be examples of a communication subsystem 930. The communications subsystem 930 may permit data to be exchanged with a network (such as the network described below, to name one example), other computer systems, and/or any other devices described herein. In many embodiments, the computer system 900 may further comprise a non-transitory working memory 935, which can include a RAM or ROM device, as described above. According to one embodiment of the present invention, the memory 161 can be an example of a non-transitory working memory 935.

Communications subsystem 930 may be linked to an antenna subsystem 950 which may comprise a single antenna, multiple antennas or an antenna array and may correspond to antenna 132 and/or 172 in the mobile device 116. Antenna subsystem may be used to communicate wirelessly—e.g. according to signaling for GSM, WCDMA, LTE, CDMA2000 and/or WiFi IEEE 802.11—by entities such as preferred mobile device 116, non-preferred mobile device 122, location server 300 and/or terrestrial wireless transceiver 200. Such wireless communication may enable reception of obfuscated locations and other information by a preferred mobile device 116. According to some embodiments, communication subsystem 930 and antenna subsystem 950 can be used as a transceiver 955 to communicate wirelessly (e.g., receive/transmit data) by entities (e.g., preferred mobile device 116, non-preferred mobile device 122, terrestrial wireless transceiver 200 and/or location server 300).

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIGS. 6, 7A-F and 8, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 900) to perform methods in accordance with the disclosure. For example, some or all of the procedures of the described methods may be performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein, for example one or more of the elements of the method described with respect to FIGS. 6, 7A-F, and 8.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 925. Volatile media include, without limitation, dynamic memory, such as the working memory 935. Transmission media include, without limitation, coaxial cables, copper wire and fiber optics, including the wires that comprise the bus 905, as well as the various components of the communications subsystem 930 (and/or the media by which the communications subsystem 930 provides communication with other devices). Hence, transmission media can also take the form of waves (including without limitation radio, acoustic and/or light waves, such as those generated during radio-wave and infrared data communications). According to some embodiments, the location servers 300, 420, terrestrial wireless transceiver 200, non-preferred mobile device 122 and/or preferred mobile device 116 can utilize a communication subsystem 930 to communicate with each other.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. "Data storage media" as used herein refers to manufactures and does not refer to transitory propagating signals. By way of example, and not limitation, such computer-readable media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above may also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware stored on computer-readable media.

Various examples have been described. These and other examples are within the scope of the following claims.

What is claimed is:

1. A method comprising:
   receiving, by a mobile device, data for a terrestrial transceiver, wherein the data includes a unique identifier comprising a MAC address or a cell ID and the data includes location coordinates of the terrestrial transceiver that have been modified with a predetermined obfuscation term, the predetermined obfuscation term causing the location coordinates of the terrestrial transceiver to be less accurate than the location coordinates of the terrestrial transceiver would be without the predetermined obfuscation term;
   determining, by the mobile device, the predetermined obfuscation term, the determining comprising:
      determining one or more binary values using the unique identifier, and
      multiplying the one or more binary values by a known scaling factor to calculate the predetermined obfuscation term;

removing, by the mobile device, the predetermined obfuscation term from the location coordinates of the terrestrial transceiver to determine a corrected location of the terrestrial transceiver;

calculating, by the mobile device, a location of the mobile device based at least in part on the corrected location of the terrestrial transceiver; and providing, by the mobile device, the location of the mobile device to an application on the mobile device.

2. The method of claim 1, wherein determining the predetermined obfuscation term further comprises transforming bits in the location coordinates of the terrestrial transceiver, based on a known ciphering key or known transformation method.

3. The method of claim 1, wherein the data further includes a location of a second terrestrial transceiver, and wherein determining the predetermined obfuscation term further comprises:

determining, by the mobile device, a mapping table, wherein the mapping table includes association information about the terrestrial transceiver and the second terrestrial transceiver; and calculating the predetermined obfuscation term based on the mapping table and the location of the second terrestrial transceiver, wherein the corrected location of the terrestrial transceiver comprises the location of the second terrestrial transceiver based on the mapping table.

4. The method of claim 1, wherein determining the predetermined obfuscation term further comprises:

receiving information from a location server associated with the mobile device and a first server; and determining the predetermined obfuscation term based on the received information.

5. The method of claim 1, wherein determining the predetermined obfuscation term further comprises:

receiving broadcast information from the terrestrial transceiver; and determining the predetermined obfuscation term based on the broadcast information.

6. The method of claim 1, wherein the data further includes a serving network ID or a provider ID, and wherein the determining the predetermined obfuscation term is further based on the serving network ID or the provider ID.

7. The method of claim 1, wherein determining the predetermined obfuscation term further comprises:

storing, by the mobile device, a known ciphering key; and altering bits associated with the received data, wherein the altering is based on the known ciphering key.

8. A mobile device comprising:

memory;

a transceiver configured to receive data for a terrestrial transceiver, wherein the data includes a unique identifier comprising a MAC address or a cell ID and the data includes location coordinates of the terrestrial transceiver that have been modified with a predetermined obfuscation term, the predetermined obfuscation term causing the location coordinates of the terrestrial transceiver to be less accurate than the location coordinates of the terrestrial transceiver would be without the predetermined obfuscation term; and one or more processors configured to:

determine the predetermined obfuscation term, the determining comprising:

determining one or more binary values using the unique identifier, and multiplying the one or more binary values by a known scaling factor to calculate the predetermined obfuscation term;

remove the predetermined obfuscation term from the location coordinates of the terrestrial transceiver to determine a corrected location of the terrestrial transceiver;

calculate a location of the mobile device based at least in part on the corrected location of the terrestrial transceiver; and provide the location of the mobile device to an application on the mobile device.

9. The mobile device of claim 8, wherein determining the predetermined obfuscation term further comprises transforming bits in the location coordinates of the terrestrial transceiver, based on a known ciphering key or known transformation method.

10. The mobile device of claim 8, wherein the data further includes a location of a second terrestrial transceiver, and wherein the one or more processors is further configured to:

determine a mapping table, wherein the mapping table includes association information about the terrestrial transceiver and the second terrestrial transceiver; and calculate the predetermined obfuscation term based on the mapping table and the location of the second terrestrial transceiver, wherein the corrected location of the terrestrial transceiver comprises the location of the second terrestrial transceiver based on the mapping table.

11. The mobile device of claim 8, the one or more processors further configured to:

receive information from a location server associated with the mobile device and a first server; and determine the predetermined obfuscation term based on the received information.

12. The mobile device of claim 8, wherein the transceiver further configured to receive broadcast information from the terrestrial transceiver, and wherein the one or more processors is further configured to:

determine the predetermined obfuscation term based on the broadcast information.

13. The mobile device of claim 8, wherein the data further includes a serving network ID or a provider ID, and wherein the determining the predetermined obfuscation term is further based on the serving network ID or the provider ID.

14. The mobile device of claim 8, wherein the memory is configured to store a known ciphering key, and wherein the one or more processors is further configured to:

alter bits associated with the received data, wherein the altering is based on the known ciphering key.

15. A non-transitory computer-readable medium storing computer-executable instructions that, when executed, cause one or more computing devices included in a mobile device to:

receive data for a terrestrial transceiver, wherein the data includes a unique identifier comprising a MAC address or a cell ID and the data includes location coordinates of the terrestrial transceiver that have been modified with a predetermined obfuscation term, the predetermined obfuscation term causing the location coordinates of the terrestrial transceiver to be less accurate than the location coordinates of the terrestrial transceiver would be without the predetermined obfuscation term;

determine the predetermined obfuscation term, the determining comprising:

determining one or more binary values using the unique identifier, and multiplying the one or more binary values by a known scaling factor to calculate the predetermined obfuscation term;

remove the predetermined obfuscation term from the location coordinates of the terrestrial transceiver to determine a corrected location of the terrestrial transceiver;

calculate a location of the mobile device based at least in part on the corrected location of the terrestrial transceiver; and provide the location of the mobile device to an application on the mobile device.

16. An apparatus comprising:

means for receiving data for a terrestrial transceiver, wherein the data includes a unique identifier comprising a MAC address or a cell ID and the data includes location coordinates of the terrestrial transceiver, and wherein the location coordinates of the terrestrial transceiver include a predetermined obfuscation term, the predetermined obfuscation term included with the location coordinates of the terrestrial transceiver upon transmittal in order to obfuscate the location of the terrestrial transceiver;

means for determining the predetermined obfuscation term based on the data including means for determining one or more binary values using the unique identifier and means for multiplying the one or more binary values by a known scaling factor to calculate the predetermined obfuscation term;

means for removing the predetermined obfuscation term from the location coordinates of the terrestrial transceiver to determine a corrected location of the terrestrial transceiver;

means for calculating a location of the apparatus based at least in part on the corrected location of the terrestrial transceiver; and means for providing the location of the apparatus to an application on the apparatus.

17. The apparatus of claim 16, wherein the means for determining the predetermined obfuscation term further includes means for transforming bits in the location coordinates of the terrestrial transceiver, based on a known ciphering key or known transformation method.

18. The apparatus of claim 16, wherein the data further includes a location of a second terrestrial transceiver, and wherein the means for determining the predetermined obfuscation term further comprises:

means for determining a mapping table, wherein the mapping table includes association information about the terrestrial transceiver and the second terrestrial transceiver; and means for calculating the predetermined obfuscation term based on the mapping table and the location of the second terrestrial transceiver, wherein the corrected location of the terrestrial transceiver comprises the location of the second terrestrial transceiver based on the mapping table.

19. The apparatus of claim 16, wherein the means for determining the predetermined obfuscation term further comprises:

means for receiving information from a location server associated with the apparatus and a first server; and means for determining the predetermined obfuscation term based on the received information.

20. The apparatus of claim 16, wherein the means for determining the predetermined obfuscation term further comprises:

means for receiving broadcast information from the terrestrial transceiver; and means for determining the predetermined obfuscation term based on the broadcast information.

21. The apparatus of claim 16, wherein the data further includes a serving network ID or a provider ID, and wherein the determining the predetermined obfuscation term is further based on the serving network ID or the provider ID.

22. The apparatus of claim 16, wherein the means for determining the predetermined obfuscation term further comprises:

means for storing a known ciphering key; and means for altering bits associated with the received data, wherein the altering is based on the known ciphering key.

23. A method comprising:

receiving a request for location coordinates of a terrestrial transceiver;

providing, to a mobile device, the location coordinates of the terrestrial transceiver that have been modified with a predetermined obfuscation term, the predetermined obfuscation causing the location coordinates of the terrestrial transceiver to be less accurate than the location coordinates of the terrestrial transceiver would be without the predetermined obfuscation term; and providing, to the mobile device, correction data, wherein the correction data includes a unique identifier comprising a MAC address or a cell ID and wherein the correction data is used to generate a corrected location of the terrestrial transceiver by removing, from the location coordinates of the terrestrial transceiver, the predetermined obfuscation term based on determining one or more binary values using the unique identifier and multiplying the one or more binary values by a known scaling factor to calculate the predetermined obfuscation term.

24. The method of claim 23, wherein removing the predetermined obfuscation term is further based on transforming bits in the location coordinates of the terrestrial transceiver, based on a known ciphering key.

25. The method of claim 23, wherein removing the predetermined obfuscation term is further based on:

broadcast information transmitted from the terrestrial transceiver; and generating the predetermined obfuscation term based on the broadcast information.

26. The method of claim 23, wherein the correction data further includes a serving network ID or a provider ID, and wherein removing the predetermined obfuscation term is based further on the serving network ID or the provider ID.

27. The method of claim 23, wherein the correction data further comprises a known ciphering key; and the predetermined obfuscation term is removed based further on altering bits based on the known ciphering key.

28. An apparatus comprising:

a terrestrial transceiver configured to:

receive a request for location coordinates of the terrestrial transceiver;

provide, to a mobile device, the location coordinates of the terrestrial transceiver, wherein the location coordinates of the terrestrial transceiver include a predetermined obfuscation term, the predetermined obfuscation term included with the location coordinates of the terrestrial transceiver in order to obfuscate the location of the terrestrial transceiver; and provide, to the mobile device, correction data, wherein the correction data includes a unique identifier comprising a MAC address or a cell ID and wherein the correction data is used to generate a corrected location of the terrestrial transceiver by removing the predetermined obfuscation term from the location coordinates of the terrestrial transceiver based on determining one or more binary values using the unique identifier and multiplying the one or more binary values by a known scaling factor to calculate the predetermined obfuscation term.

29. The apparatus of claim 28, wherein removing the predetermined obfuscation term is further based on transforming bits in the location coordinates of the terrestrial transceiver, based on a known ciphering key.

30. The apparatus of claim 28, wherein removing the predetermined obfuscation term is further based on:
  broadcast information transmitted from the terrestrial transceiver; and
  generating the predetermined obfuscation term based on the broadcast information.

31. The apparatus of claim 28, wherein the correction data further includes a serving network ID or a provider ID, and wherein removing the predetermined obfuscation term is based further on the serving network ID or the provider ID.

32. The apparatus of claim 28, wherein the correction data further comprises a known ciphering key; and
  the predetermined obfuscation term is removed based further on altering bits based on the known ciphering key.

33. An apparatus comprising:
  means for receiving a request for location coordinates of a terrestrial transceiver;
  means for providing, to a mobile device, the location coordinates of the terrestrial transceiver, wherein the location coordinates of the terrestrial transceiver include a predetermined obfuscation term, the predetermined obfuscation term included with the location coordinates of the terrestrial transceiver in order to obfuscate the location of the terrestrial transceiver; and
  means for providing, to the mobile device, correction data, wherein the correction data includes a unique identifier comprising a MAC address or a cell ID and wherein the correction data is used to generate a corrected location of the terrestrial transceiver by removing the predetermined obfuscation term from the location coordinates of the terrestrial transceiver based on determining one or more binary values using the unique identifier and multiplying the one or more binary values by a known scaling factor to calculate the predetermined obfuscation term.

34. A non-transitory computer-readable medium storing computer-executable instructions that, when executed, cause one or more computing devices to:
  receive a request for location coordinates of a terrestrial transceiver;
  provide, to a mobile device, the location coordinates of the terrestrial transceiver, wherein the location coordinates of the terrestrial transceiver include a predetermined obfuscation term; and
  provide, to the mobile device, correction data, wherein the correction data includes a unique identifier comprising a MAC address or a cell ID and wherein the correction data is used to generate a corrected location of the terrestrial transceiver by removing the predetermined obfuscation term from the location coordinates of the terrestrial transceiver based on determining one or more binary values using the unique identifier and multiplying the one or more binary values by a known scaling factor to calculate the predetermined obfuscation term.

* * * * *